United States Patent [19]

Deyesso et al.

[11] 3,789,971
[45] Feb. 5, 1974

[54] SERVO CONTROL SYSTEM FOR A SERIAL PRINTER PRINT HEAD

[75] Inventors: Joseph P. Deyesso, Walpole; Gaston A. Palombo, Chelmsford, both of Mass.

[73] Assignee: Honeywell Information Systems, Inc., Waltham, Mass.

[22] Filed: June 21, 1971

[21] Appl. No.: 155,187

[52] U.S. Cl............ 197/18, 178/34, 318/685
[51] Int. Cl............................. B41j 23/04
[58] Field of Search........... 197/18, 48, 49, 55, 6.6; 173/34; 318/467, 685; 199/18

[56] References Cited
UNITED STATES PATENTS

| | | | |
|---|---|---|---|
| 3,435,310 | 3/1969 | Bradley | 318/685 X |
| 3,586,953 | 6/1971 | Markkanen et al. | 318/685 |
| 3,644,812 | 2/1972 | Bitto et al. | 318/685 X |
| 3,366,214 | 1/1968 | Tutert et al. | 197/48 |
| 3,291,292 | 12/1966 | Netznik et al. | 199/18 X |
| 2,927,676 | 3/1960 | Abbondanza | 197/6.6 |
| 3,227,258 | 1/1966 | Pannier et al. | 197/6.6 |

Primary Examiner—Robert E. Pulfrey
Assistant Examiner—R. T. Rader
Attorney, Agent, or Firm—William F. White; Ronald T. Reiling

[57] ABSTRACT

A novel print head positional control system for a serial printer is disclosed herein. The positional control system includes logic for determining the minimum displacements in each of two directions in order to move the print head to a new print position. The positional control system furthermore contains servo logic for implementing the determined minimal displacements in such a manner as to cause the print head to move in each direction at a number of different velocity levels depending on the magnitude of each minimal displacement. The positional control system also contains closed loop velocity servos which smoothly move the print head through the various velocity transitions to the next velocity level. The positional control system lastly contains a fine positioning servo that is switched to upon completing the final velocity approach to the new print position.

25 Claims, 18 Drawing Figures

PATENTED FEB 5 1974
3,789,971
SHEET 01 OF 11
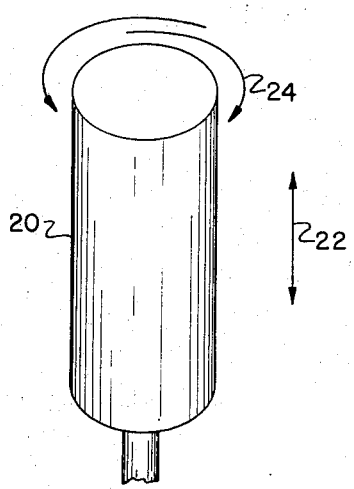
FIG. 1
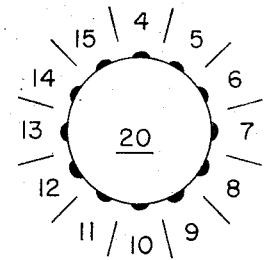
FIG. 2A
FIG. 2B
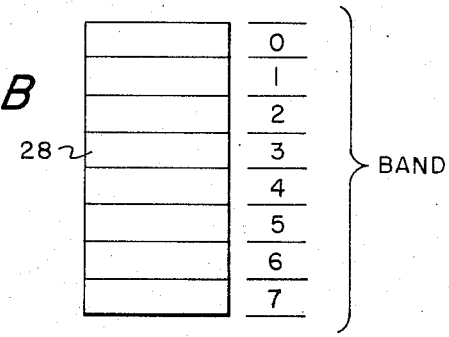
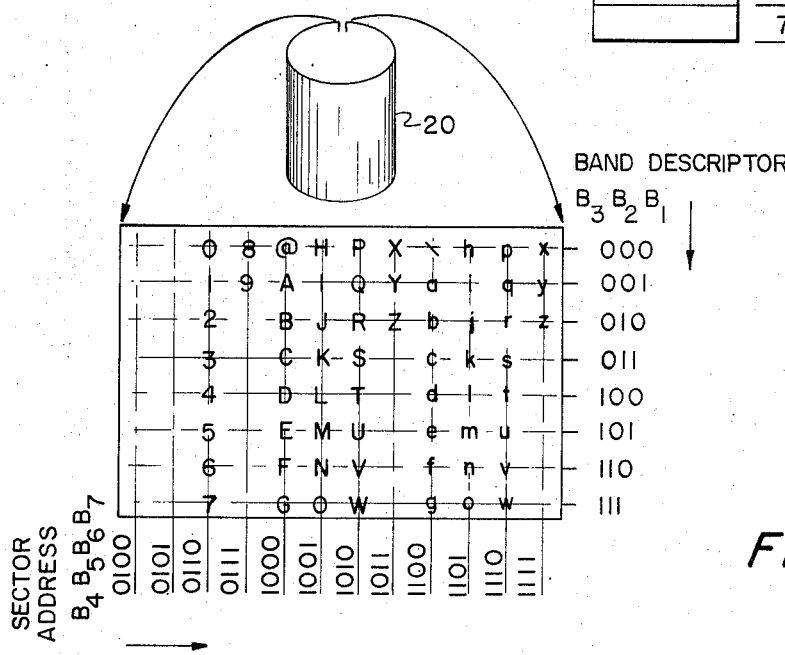
FIG. 2C
USASCII CODE FOR ANY CHARACTER ON DRUM:
$\underbrace{B_7 B_6 B_5 B_4}_{\text{SECTOR ADDRESS}}$ $\underbrace{B_3 B_2 B_1}_{\text{BAND ADDRESS}}$
INVENTORS
JOSEPH P. DEYESSO
GASTON A. PALOMBO
BY
ATTORNEY

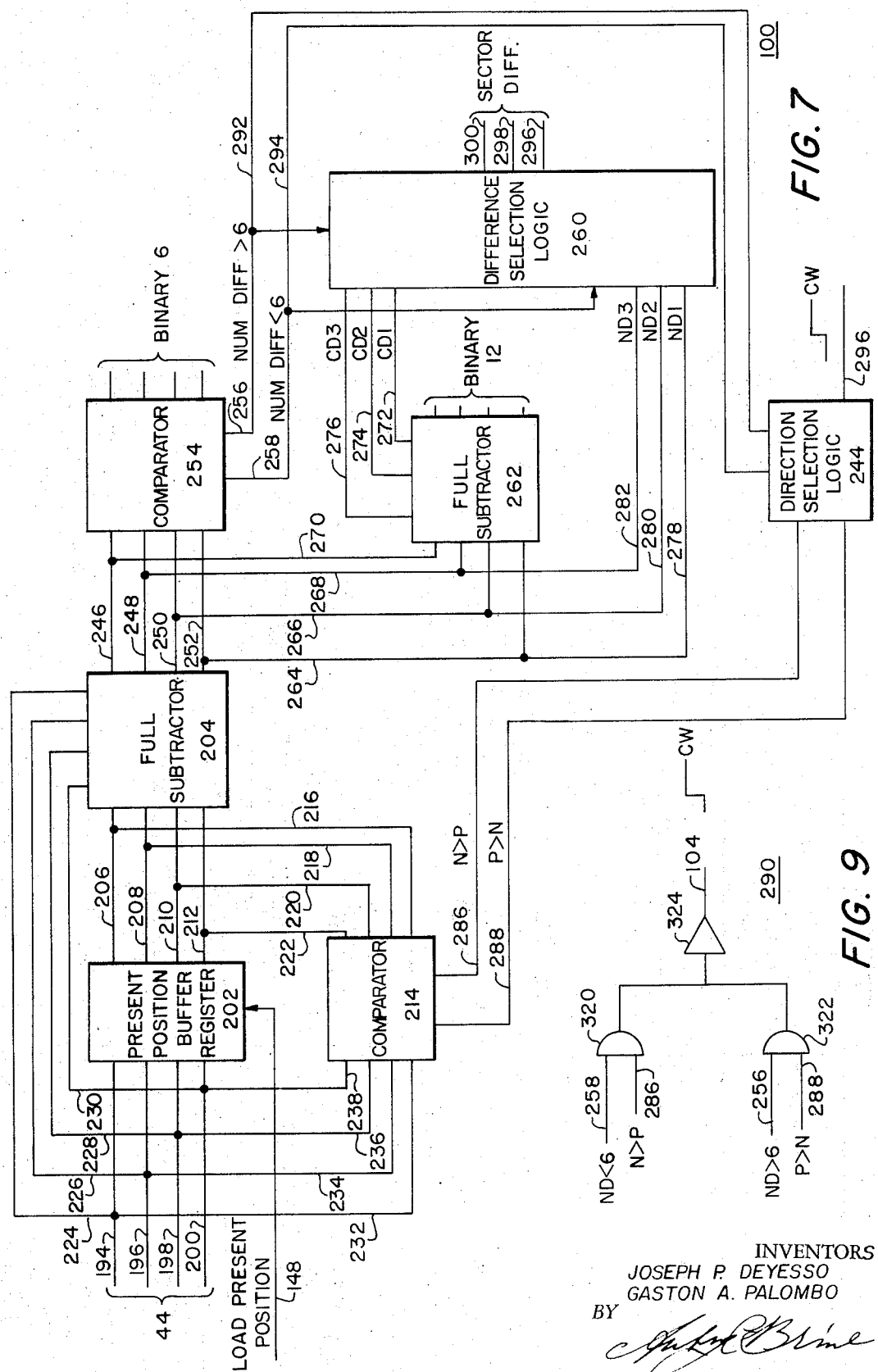

SERVO CONTROL SYSTEM FOR A SERIAL PRINTER PRINT HEAD

RELATED APPLICATIONS

The following commonly assigned application relates to the herein described invention: U.S. application Ser. No. 202,031, entitled Ramp Generator to R. A. Belson and G. A. Palombo, filed Nov. 24, 1971 as a divisional application of U.S. application Ser. No. 22,235, now U.S. Pat. No. 3,644,086 filed Mar. 24, 1970.

BACKGROUND OF THE INVENTION

The present invention relates to printer control systems, and, more particularly, to a new and improved control system for axially and rotatably positioning a serial printer print head.

The serial printer concept may be stated quite simply as the rotational and axial displacement of a multiple character print head so as to position a given character on the print head surface. The print head surface contains a number of bands with each band itself containing a number of distinct characters. To position a particular character, the print head must be moved to a particular band and rotated to a given character within the selected band. Printing of the positioned character is then accomplished by singularly impacting it with a suitable print medium.

As stated previously, the present invention is concerned with the logical control for positioning a print head so as to align a given character on the print head surface for subsequent impact printing. In the past, this type of positioning control apparatus has often required that the print head be first moved through a home position before the logical control could begin to move it to a new print position. This is usually accompanied by movement in a single direction only which is also commonplace in most printer control systems. The movement of the print head itself is usually accomplished at some maximum velocity which in turn produces overshoot and oscillatory vibration at the newly arrived at print position.

The present invention, therefore, has as an object to provide a print head positional control system with the capability of positioning the print head relative only to its present print position.

Another object of this invention is to provide a print head positional control system wherein the minimum displacement of the print head is first determined and thereafter used in positioning the print head.

A still further object of this invention is to provide a print head positional control system wherein the print head is caused to be positioned in a stepped velocity profile depending on how far the print head is to be displaced before arriving at the new print position.

An even further object of this invention is to provide a print head positional control system wherein the print head is smoothly moved through the stepped velocity profile in a series of controlled ramps to thereby minimize overshoot and oscillatory vibration.

SUMMARY OF THE INVENTION

To achieve the above-mentioned objects, the present invention provides a print head positional control system wherein the control logic first calculates minimum displacements for the print head in each of two directional movements, namely, the axial direction and the rotational direction. The minimum displacements are defined in terms of an approach direction (i.e. clockwise or counterclockwise for rotation) and a distance of travel in the particular approach direction. The control logic next commands a stepped velocity profile pattern for a downstream closed loop velocity servo system which depends on the distance of travel necessary to achieve the new print position according to the minimum displacement. The downstream closed loop velocity servo system executes a series of smooth velocity transitions conforming to the velocity profile pattern so as to bring the print head to zero velocity. The control logic then switches the downstream servo into a positional closed loop for the final fine positioning of the print head.

BRIEF DESCRIPTION OF THE DRAWINGS

For a better understanding of the present invention, reference should be made to the accompanying drawings wherein:

FIG. 1 is a perspective view of a serial printer print head with depicted directions of movement for the positioning of a character.

FIG. 2A is a top view of the print head of FIG. 1 showing a circumferential apportionment of the print head into twelve individual sectors.

FIG. 2B is an elevational view of the print head of FIG. 1 showing an axial apportionment of the print head into eight separate bands.

FIG. 2C is a spread out view of the cylindrical print head surface of FIG. 1 representatively showing a USASCII binary coded arrangement of characters.

FIG. 7 is a logic block diagram of the sector direction and control logic of FIG. 3.

FIG. 9 is a detailed logic block diagram of the direction selection logic within the sector direction and control logic of FIG. 7.

DESCRIPTION OF THE PREFERRED EMBODIMENT

Figure 3:
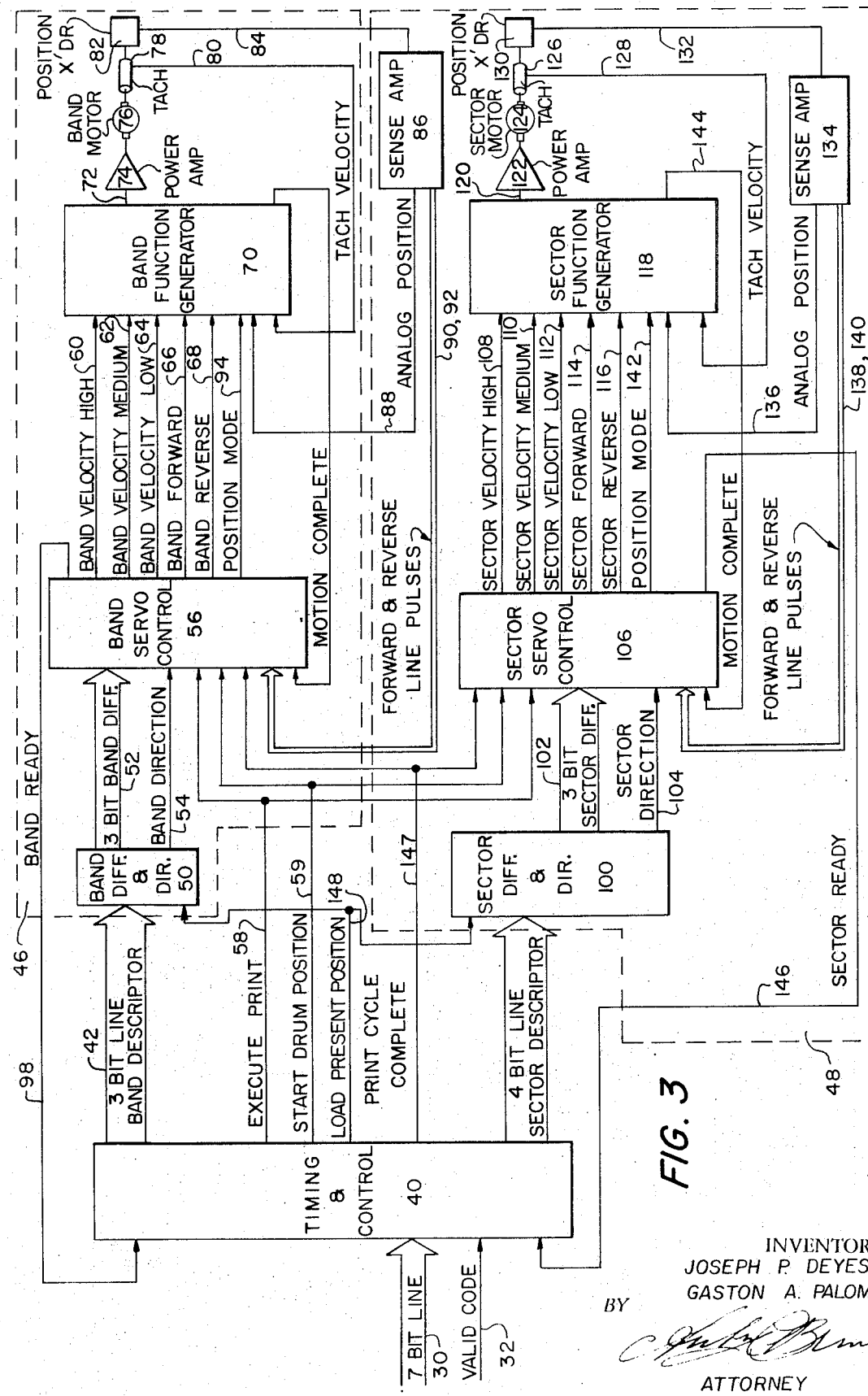
FIG. 3 is an overall schematic block diagram of the print head control logic and servo system.

FIG. 1 shows a print head 20 with a double arrowed axial direction of movement 22 and a double arrowed rotational direction of movement 24. There are a number of known mechanical implementations for accomplishing the indicated directional movements of the print head 20. One such mechanical implementation is shown and described in U.S. application Ser. No. 94,144 to C. Pateuk and S. Cahill, filed on Dec. 1, 1970. The subject matter of the present invention is directed to a logical servo system that controls a pair of motors which in turn drive a mechanical implementation such as shown, for example, in the aforementioned U.S. Application.

In order to define the movement of the print head 20 in the indicated directions 22 and 24 so as to accurately position the characters thereon, a system of identifying character positions on the print head is necessary. The character positions on the print head 20 of FIG. 1 are identified in FIGS. 2A and 2B by a sector descriptor 26 and a band descriptor 28. The sector descriptor 26 is seen to comprise twelve individual sector locations located around the circumference of the print head 20 while the band descriptor 28 is seen to include eight bands located axially along the print head 20. The sector and band locations are identifiable in a decimal form with the sector descriptor 26 increasing in the clockwise direction and the band descriptor 28 increasing in the downward direction. The sector descriptors run 4 to 15 (thus requiring a four bit binary descriptor) and the band descriptors run 0 to 7 (requiring a three bit binary descriptor). The band and sector descriptors are coded in binary according to the conventional USASCII code as shown in FIG. 2C. This code dictates in the present print head configuration that the lowest ordered three bits describe the band descriptors 0-7 and that the highest ordered four bits describe the sector descriptors 4-15. The USASCII code furthermore dictates that the sector descriptor be read starting from the highest ordered bit. Hence for the USASCII code of FIG. 2C, it is seen that the character A on the print head 20 is coded as 1001000 wherein the low ordered three bits define the band descriptor 1 and the higher ordered four bits define the sector descriptor 8.

Figure 4:
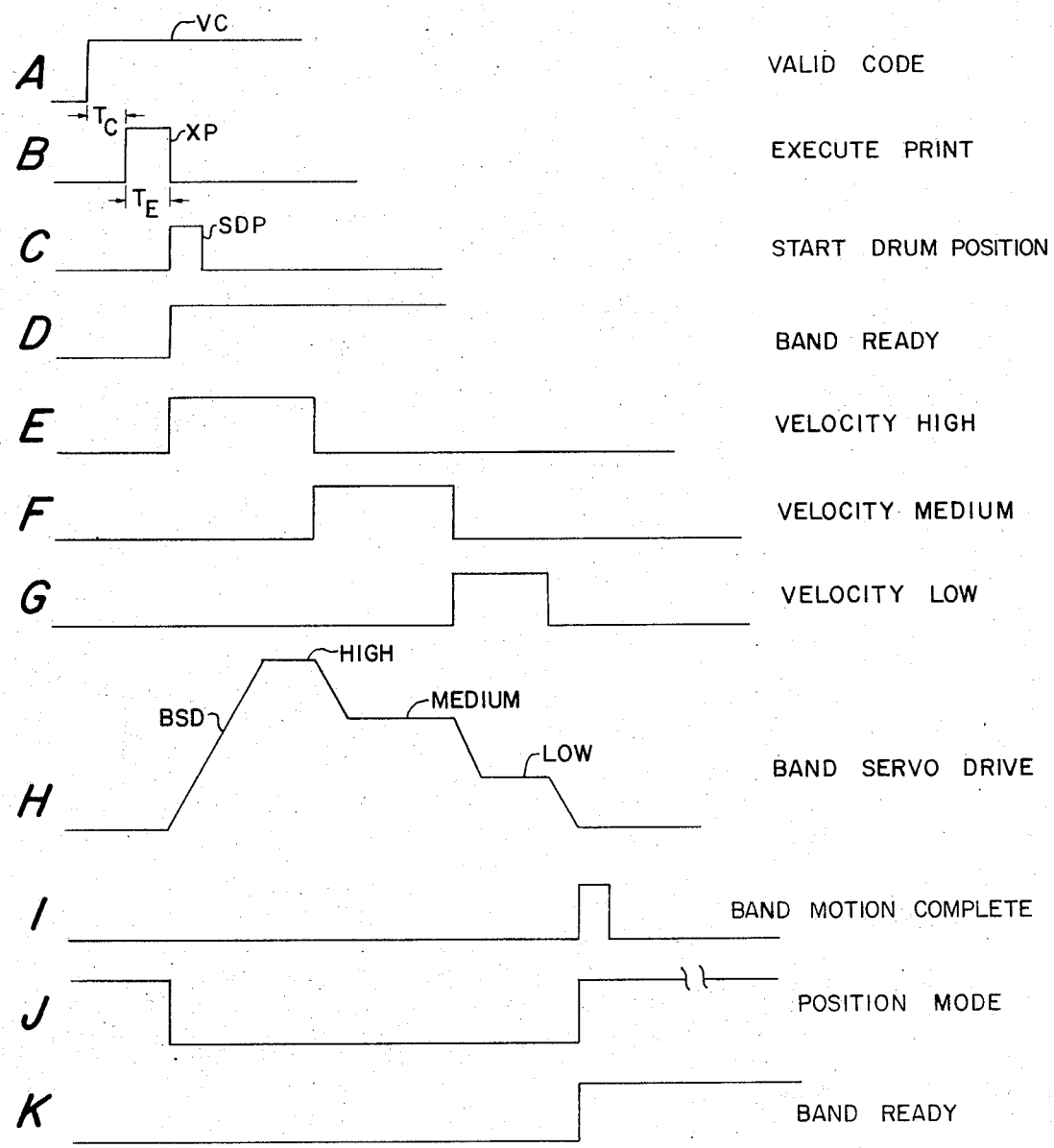
FIG. 4 is a schematic showing of the various signals associated within the band channel logic of FIG. 3.

Turning now to FIG. 3, there is shown on overall exits diagram of the logic and servo control for positioning the print head 20 according to a newly presented USASCII coded character coming in on a seven bit line 30. The information on the seven bit line 30 is identified as a valid USASCII coded character by the presence of a valid code signal, VC, as shown in FIG. 4A and occurring on a line 32. The seven bit line 30 feeds into a timing and control logic block 40 which in turn divides the incoming seven bits into a three bit description of the new band position which exists on a line 42 and a four bit description of the new sector position which exists on a line 44. At this point, it is to be noted that a pair of separate band and sector channels, 46 and 48 (outlined by dotted lines), exist for handling the new band and sector information coming in on the lines 42 and 44 respectively. The band and sector channels, 46 and 48 each contain particularized logic and associated closed loop servos for implementing controlled axial and rotational movements, 22 and 24, in response to the band and sector descriptors 28 and 26 coming in on the lines 42 and 44 respectively, for the purpose of positioning the print head 20 to the proper location for printing any specific character.

Turning now to the band channel 46, it is seen that a new band descriptor on three bit line 42 feeds into a band difference and direction logic 50. The band difference and direction logic 50 performs both a difference calculation between the new band descriptor 28 being fed in on the line 42 and a present band position of the print head 20 which has been previously stored within a present position register. This as well as all internal workings of the band difference and direction logic 50 will be more fully explained hereinafter. For the present, suffice it to note that the band difference and direction logic 50 includes a binary subtraction between the new band descriptor 28 on line 42 and the stored present band position of the print head 20. The resulting three bit band difference is outputed on a line 52. A band direction is also calculated within the band difference and direction logic 50 and is outputed on a line 54.

The three bit band difference on the line 52 and the band direction on the line 54 are inputed to a band servo control logic 56. After a delay Tc from the start of VC, as shown in FIG. 4A, to allow the band difference and direction as calculated to be valid, an execute print signal, XP, shown in FIG. 4B is inputed to the band servo control 56 via a line 58. Thus while the band difference and direction logic 50 may output meaningless signals on lines 52 and 54, it is only during an XP signal (following a VC signal) that a valid band difference and direction will be loaded into the band servo control 56. Immediately following the execute print signal, XP, in FIG. 4B there occurs a start drum position signal, SDP, in FIG. 4C which is inputed to the band servo control 56 via a line 59. The start drum position signal, SDP, occurs after the execute print signal, XP, so that a determination can be made as to whether the band difference on the line 52 is non-zero. If the incoming band difference is zero, SDP will cause the band servo control 56 to output a BAND READY signal as shown in FIG. 4D, on a line 98 signifying that the print head 20 is in a correct band position for printing and that no further motion is required. If on the other hand, a non-zero band difference occurs on the line 52, SDP will cause the band servo control 56 to select a velocity level that is either high, medium or low depending upon the number of bands to be traversed in moving the print head 20 from its current band position to the new band position. This is outputed as a high logic level on a line 60 which indicates a BAND VELOCITY HIGH condition; a line 62 which indicates a BAND VELOCITY MEDIUM condition; and a line 64 which indicates a BAND VELOCITY LOW condition. All three signals are mutually exclusive.

Referring to FIGS. 4E through 4G, a situation is shown wherein the band servo control 56 outputs all three commanded velocity levels at different periods of time. This situation will occur when the band servo control 56 determines that the band difference is large enough, i.e. seven bands, to dictate the use of a high velocity mode for the downstream servo system. The time periods for which the commanded velocity levels will remain high are a function of how long it takes to traverse a stipulated number of bands. As the difference in total number of bands decreases, the successive velocity levels of FIGS. 4F and 4G are commanded. The exact manner as to how and when the velocity levels will be commanded will be explained hereinafter. The band servo control 56 also outputs a logic level signal indicating a BAND FORWARD or a BAND REVERSE direction on a set of lines 66 and 68 respectively in accordance with the BAND DIRECTION signal appearing on the line 56. The signals on the appropriate lines will thus be high on the input side of the band function generator 70.

The commanded velocity levels on the lines 60–64 are inputed to a band function generator 70 which internally generates a ramp band servo drive signal, BSD as shown in FIG. 4H. The BSD signal is seen to first accelerate to a high velocity drive level and thereafter decelerate to first a medium velocity drive level and finally to a low velocity drive level as each successive velocity level is commanded as shown in FIGS. 4E–4G. The BSD signal is summed with a fed back velocity signal within the band function generator. The resulting error signal appears on a line 72 and is amplified by a power amplifier 74 and thereafter inputed as a drive current to a band servo motor 76. A tachometer 78 mounted on the output shaft of the band servo motor 76 feeds back a TACH VELOCITY signal for summing with the BSD signal within the band function generator 70 on a line 80. A position transducer 82 also mounted on the output shaft of the band servo motor 76 generates a position signal which is fed back on a line 84 to a sense amplifier 86. The sense amplifier 86 in turn feeds back an ANALOG POSITION signal on a line 88 to the band function generator. The sense amplifier 86 also feeds back on a pair of lines 90 and 92, a set of forward and reverse line pulses indicative of the band positions being traversed. The need for the forward and reverse line pulses will be realized when the sense amplifier 86 is hereinafter discussed. Depending on whether a forward or reverse band direction is indicated on the incoming line 54, the appropriate train of line pulses on line 90 or line 92 will be used to downcount the binary band difference that has previously been stored within a difference counter within the band servo control 56. This will all be discussed hereinafter when the band servo control 56 is particularly described. For the moment, it is to be noted that the band difference within the band servo control 56 is decremented as each band traversal is made as indicated by a line pulse on the appropriate line 90 or 92. As the band difference is so decremented, the appropriate velocity level command line from among lines 60 through 64 will go logically high. When the band servo control 56 determines that the difference counter is zero indicating that the print head 20 has been moved the required number of positions, BSD will ramp to zero from the low velocity as shown in FIG. 4H. When BSD reaches zero, a MOTION COMPLETE signal as shown in FIG. 4I, is generated in the band function generator 70 and is fed back to band servo control 56 along a line 96.

The band servo control 56 will then command the band function generator 70 to switch from a velocity mode to a POSITION MODE by creating a logically high signal on a line 94 as shown in FIG. 4J. The print head 20 will thereafter be finally positioned by the closed loop feedback of analog band position information on the line 88. A BAND READY signal from the band servo control 56 is outputed on a line 98 indicating that band positioning has been completed as shown in FIG. 4K.

Figure 5:
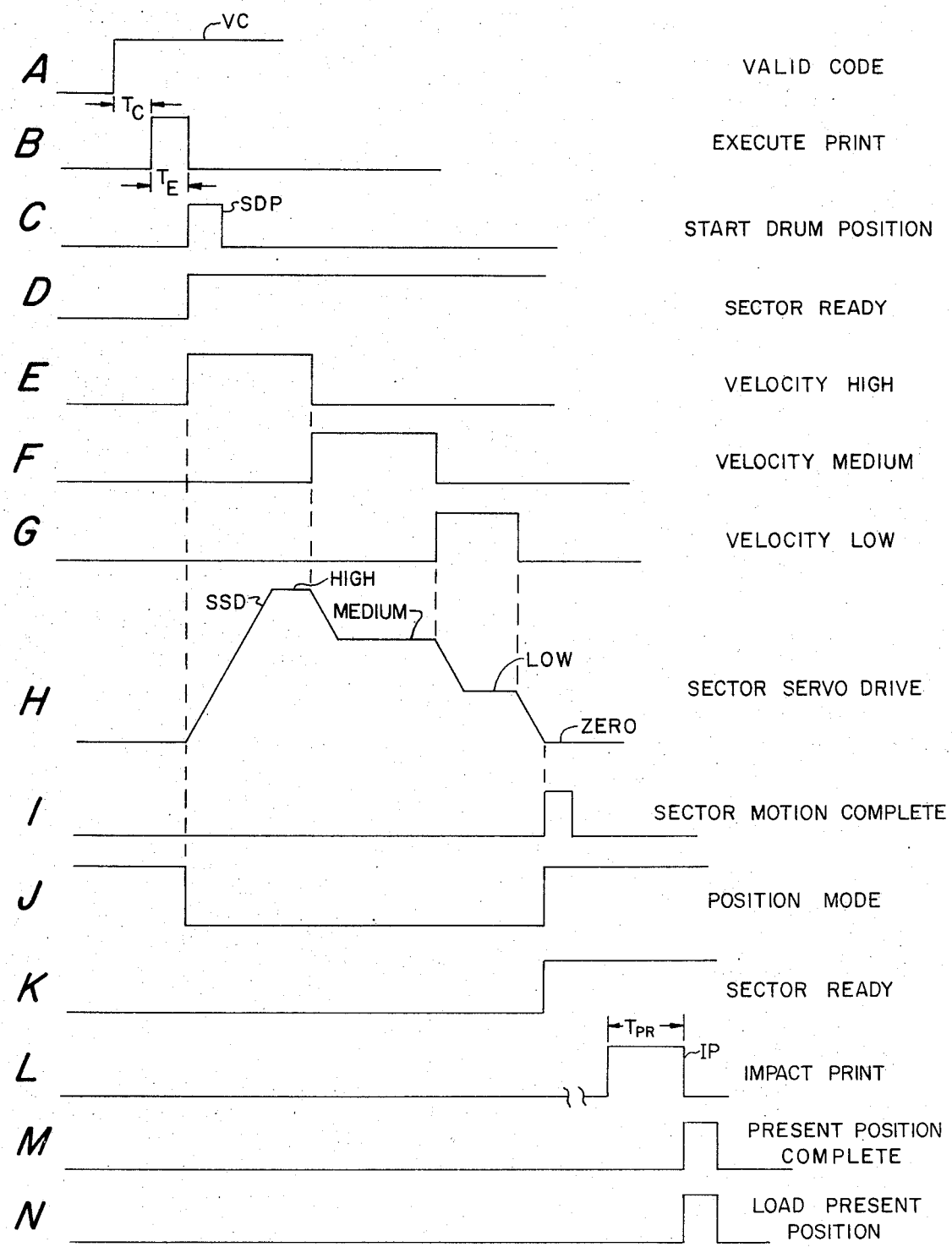
FIG. 5 is a schematic showing of the various signals associated with the sector channel logic and the timing and control logic of FIG. 3.

As stated previously, the sector channel 48 comprises a similar set of logic and servo control elements which begins with a four bit line 44 defining the new sector position per sector descriptor 26 entering a sector difference and direction logic 100 that calculates a sector difference and a sector direction outputing the former on a three bit sector difference line 102 and the latter on a sector direction line 104. The sector difference and sector direction lines 102 and 104 are connected to a sector servo control 106 which in response to an execute print signal, XP, as shown in FIG. 5B, on the line 58 and a start drum position signal, SDP, as shown in FIG. 5C, on the line 59 selects an appropriate logical high signal to occur on one of a set of commanded velocity level lines 108 through 112 as shown in FIGS. 4E–4G. Referring briefly to FIG. 5A, the XP signal is seen to be preceded by the VC signal as was previously explained with regard to FIG. 4A. The SECTOR READY signal of FIG. 5D is also similar to the BAND READY signal of FIG. 4D in that it occurs when the print head 20 is already correctly positioned. The sector servo control 106 also provides a logical high signal on either of a pair of lines 114 or 116 depending on whether the sector direction is forward or reverse respectively. The appropriate velocity levels are inputed to a sector function generator 118 which generates a ramp sector servo drive signal, SSD, as shown in FIG. 5H, occurring on a line 120 which is amplified by a power amplifier 122 and thereafter used to drive a sector servo motor 124. A tachometer 126 mounted on the output shaft of the sector motor 124 generates a TACH VELOCITY signal on a line 128 which is fed back to the sector function generator 118 and compared to the velocity level dictated by the SSD signal within the sector function generator 118. A position transducer 130 also mounted on the output shaft of the sector motor 124 produces position signal on a line 132 which feeds into a sense amplifier 134. The sense amplifier 134 outputs an ANALOG POSITION signal on a line 136 which is inputed to the sector function generator 118. The sense amplifier 134 also outputs a train of line pulses indicative of forward and reverse directions. The forward and reverse trains of line pulses are inputed to the sector servo control 106 via a pair of lines 138 and 140. The sector servo control 106 operates similarly to the band servo control 56 in that it downcounts the three bit sector difference and selects the appropriate one of the velocity level lines 108 through 112. When the sector servo control 106 determines that the difference counter is zero, indicating that the print head 20 has moved the required number of positions, SSD will ramp to zero from the low velocity level as shown in FIG. 5H. When the SSD signal reaches zero, a MOTION COMPLETE signal as shown in FIG. 5I is generated within the sector function generator 118 and is fed back to the sector servo control 106 along the line 144. The sector servo control 106 will then command the sector function generator 118 to switch from a velocity mode to a position mode by generating a POSITION MODE signal as shown in FIG. 5J on a line 142. The print head 20 will be finally positioned by the closed loop feedback of analog sector position information on the line 136. As final closed loop positioning is being accomplished, the sector servo control 106 generates a SECTOR READY signal (as shown in FIG. 5K) on a line 146.

It is to be understood that the BAND READY and SECTOR READY signals of FIGS. 4K and 5K may occur at different times and that both are needed in order for the timing logic 40 to assume that the print head 20 has been positioned in each of the two directions 22 and 24 respectively. When the two respective signals have been received by the timing logic 40, an impact print stroke, IPS, as shown in FIG. 5L is initiated by the timing logic 40. The impact print actuation is not itself shown or described herein as such is known in the art and does not constitute part of the present invention. Immediately following IPS, a print cycle complete signal PCC is generated on a line 147 and a load present position signal LPP is generated on a line 148. The PCC signal prepares the servo controls 56 and 106 for the next print cycle. The LPP signal loads in the band and sector descriptors 26 and 28 into the present position registers within the difference and direction logics 50 and 100 thus completing the current print cycle by storing the present position of the print head 20. The band and sector channels 46 and 48 are now ready for the next set of band and sector descriptors describing the next position that the print head 20 is to advance to.

Figure 6:
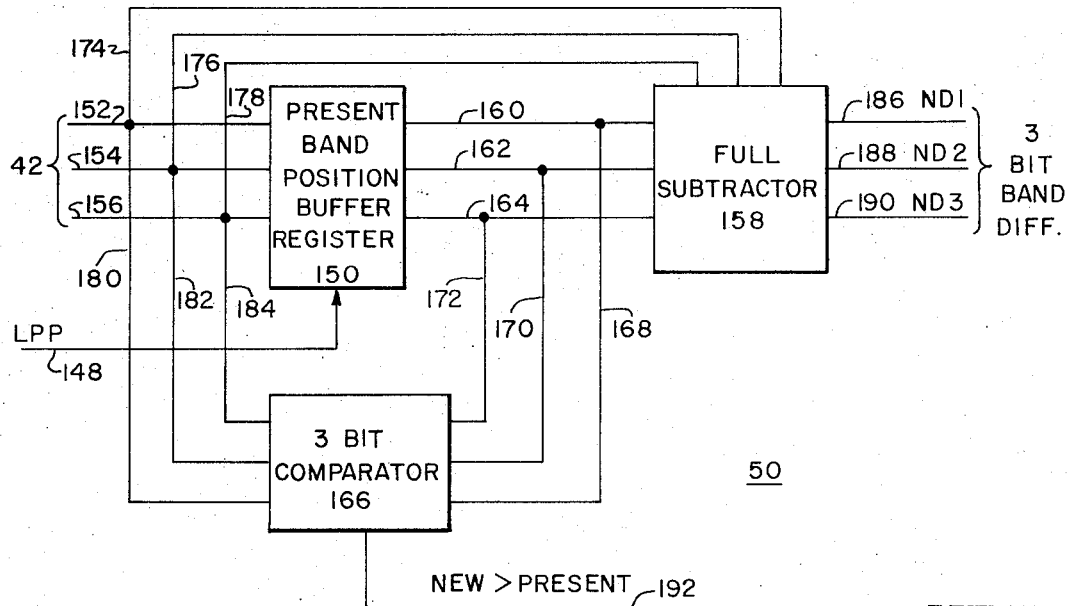
FIG. 6 is a logic block diagram of the band direction and control logic of FIG. 3.

The aforementioned description has covered the overall operation and makeup of the logic and servo control for the print head 20. The individually functioning logic elements will now be discussed as they appear within the band and sector channels 46 and 48 respectively. The first logic element within the band channel 46 is the band difference and direction logic 50 which is shown in FIG. 6. It will be remembered that the band difference and direction logic 50 calculates both a difference and a direction for which the print head 20 is to move in the axial direction. The calculation is performed by substracting the present band position which is stored within a present position register from the incoming band descriptor on the line 42. The present band position information, it will be remembered, is previously stored within the present position register during the previous print cycle.

Turning now to FIG. 6, a present position register 150 is shown wherein the present position information within it has been previously loaded into it when the previous band descriptor 26 on bit lines 152, 154 and 156 was caused to be loaded in response to the LPP signal on the line 148. Now, which is later in time, a new band descriptor is brought in on line 42 and hence the bit lines 152 through 156. This new band descriptor describes the next position that the print head 20 is to be moved to and may therefore be referred to as the band descriptor 28. The band descriptor 28 will remain on the lines 152 through 156 until the occurrence of the LPP signal on the line 148. This will not occur until the end of the current print cycle which will now be discussed.

The present band position information within the present position register 150 is applied to the subtrahend side of a full subtractor 158 by bit lines 160, 162 and 164 respectively. The same three bit present band position is also applied to the one side of a three bit comparator 166 by bit lines 168, 170 and 172 respectively.

The band descriptor 28 (now present on the lines 152, 154 and 156) is applied to the minuend side of the full subtractor 158 by lines 174, 176 and 178 respectively. A numerical difference, ND1, ND2, ND3 will be outputed from the full subtractor 158 on lines 186, 188 and 190 respectively.

The band descriptor 28 is also applied to one side of the three bit comparator 166 by a set of lines 180, 182 and 184 respectively. The three bit comparator 166 is set to go logically high on a line 192 when the new band descriptor is greater than the present band position. Referring to FIG. 2B, it is seen that when the new band descriptor is greater than present, the print head 20 will be instructed to move downward in the increasing band direction.

The sector difference and direction logic 100 contains additional computational logic over the band difference and direction logic 50. This additional logic is necessitated by the realization that there are two ways of rotating the print head 20 to a new sector position. Referring to FIG. 2A, it is seen that the print head 20 may move from a SECTOR 4 position to a sector 12 position by traveling counter clockwise four sector positions to the new sector 12 position, or it may travel eight sector positions clockwise to the new sector 12 position. There exists additional computational logic within the sector difference and direction logic 100 to determine the shortest distance of travel to the new sector position and the direction in which the shortest direction is to be accomplished. In other words, in the instant case, the logic will determine that the shortest distance to the new sector 12 position is four sector positions and the shortest direction is counter clockwise. Obviously, the maximum distance should be equal to or less than six.

The sector difference and direction logic 100 is shown in FIG. 7. The four bits of the sector descriptor 26 occurring on lines 194, 196, 198 and 200 are loaded into a present position buffer register 202 whenever a LOAD PRESENT POSITION signal appears on the line 148. The four bits of the present sector position information contained in the present position register 202 are also applied to a full subtractor 204 via lines 206, 208, 210 and 212 respectively. These same four bits of information are furthermore applied to a comparator 214 via bit lines 216, 218, 220 and 222 respectively. A new four bit sector descriptor 26 will appear on the four bit line 44 when a new USASCII coded character is inputed on the line 30 as previously discussed. The new sector descriptor 216 will appear on bit lines 194, 196, 198 and 200. The new sector descriptor 216 will also be applied to the minuend side of the full subtractor 204 via lines 224, 226, 228 and 238 to the comparator 214.

The comparator 214 compares the new sector descriptor on the left side with the present sector position on the right side and outputs either a logical high level signal on a line 240 or a logical high level signal on a line 242 depending on whether the new sector descriptor is greater than the present sector position, N>P, or the present sector position is greater than the new sector descriptor, P>N. The appropriate high level signal is inputed to a direction selection logic 244 which will be explained hereinafter.

Returning now to the full subtractor 204 wherein the present sector position is subtracted from the new sector descriptor and the calculated numerical difference, ND, is outputed on lines 246, 248, 250 and 252 respectively. The calculated numerical difference, ND, is first applied to a binary 6 comparator 254 which outputs either a high signal for a ND>6 on a line 256 or a high signal for a ND<6 on a line 258. These numerical difference comparisons with 6 are inputed to both a difference selection logic 260 and to the previously mentioned direction selection logic 244. Both of these selection logics will be explained hereinafter. The calculated numerical difference, ND, is also applied to the subtrahend side of a full subtractor 262 via a set of lines 264, 266, 268 and 270. The full subtractor 262 subtracts the numerical difference, ND, from a binary 12 and outputs a corrected difference, CD, on lines 272, 274 and 276. Since it is possible to obtain a numerical difference, ND, of 7 through 11 out of the full subtractor 204, it is necessary to perform this 12-ND subtraction. The corrected difference, CD, represents the difference which will be eventually selected within the difference selection logic 260 when the numerical difference, ND, is greater than 6. The resulting corrected difference CD only requires the three bit lines 272 through 276 since a three bit binary value which is less than 6 will only be of interest to the difference selection logic 260. Similarly, the first three bits of the numerical difference, ND, are only applied via lines 278, 280 and 282 to the difference selection logic 260.

Figure 8:
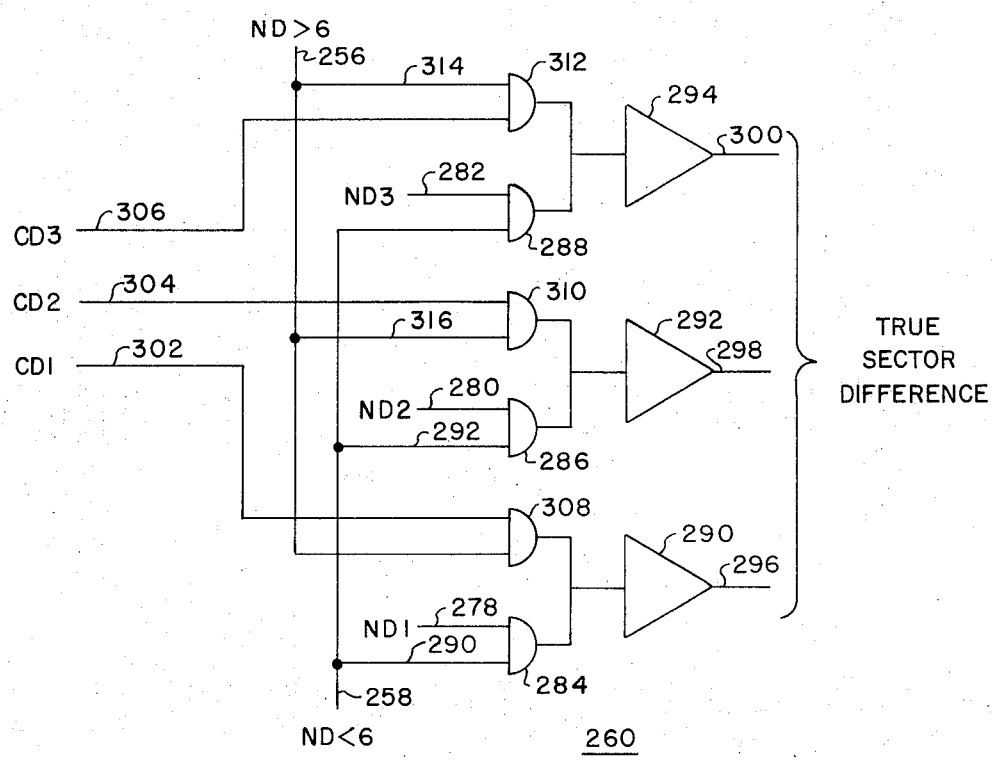
FIG. 8 is a detailed logic block diagram of the difference selection logic within the sector direction and control logic of FIG. 7.

Turning now to the difference selection logic 260 which is shown in detail in FIG. 8, the difference selection logic 260 implements the following algorithms:
1. if ND<6, then ND is the true difference
2. if ND>6, then CD is the true difference.

The above two algorithms are implemented within the difference selection logic 260, with the true difference, TD, outputed on the 3 bit line 102 as shown in FIG. 3. The first algorithm is seen to be implemented in FIG. 8 by gating the numerical difference, ND1, ND2, and ND3 coming in on lines 278, 280 and 282, with the ND<6 signal coming in on line 258 which is branched into AND gates 284, 286 and 288 via branch lines 290 and 292. If the ND<6 signal is high on line 258, then the ND is gated through AND gates 284, 286 and 288 and through a set of OR gates 290, 292 and 294 to become the true difference, TD, on lines 296, 298 and 300. The second algorithm is implemented by gating the corrected difference, CD, coming in on lines 302, 304 and 306 with ND>6 coming in on the line 256 and branched into AND gates 308, 310 and 312 via branch lines 314 and 316. If the ND>6 signal is high, then the corrected difference is gated through the OR gates 290, 292 and 294 to thus become the true difference, TD, on lines 296, 298 and 300. ND>6 and ND<6 are logical inverses except for when the ND=6 in which case they are both logical one, however, this is a don't care condition since CD also = 6.

Turning now to the direction selection logic 290, which is shown in detail in FIG. 9, the direction selection logic implements the following algorithms:
if ND<6 and N>P, or
if ND>6 and P>N, than proceed clockwise.

This is implemented by gating together at AND gate 320, ND<6 on line 258 with N>P on line 286, as well as gating together at AND gate 322, ND>6 on line 256 with P>N on line 288. The two ANDed conditions are inputed to OR gate 324 and the resulting signal is outputed on line 104 to serve as the SECTOR DIRECTION signal for the sector servo control 106.

Referring back to FIG. 3, it will be noted that the difference and direction signals originating from the difference and direction logics 50 and 100 are each fed into their respective band and sector servo controls 56 and 106. The band servo control 56 will first be described in conjunction with the detailed logic layout of FIG. 10. Beginning with bit lines 162 through 166, the three bit band difference (as calculated by the band difference and direction logic 50) is parallel loaded through AND gates 326, 328 and 330 into a downcounter 332 in response to an execute print signal, XP, occurring on the line 58. The now stored three bit band difference in the downcounter 332 is to be decremented each time a band position on the print head 20 is traversed.

It will be remembered that the digital indications for the successive band traversals are fed back as spaced pulses on the lines 90 and 92 respectively. The necessity of having two such lines of spaced pulses will be explained hereinafter when the sense amplifier is taken up. Suffice it to say that the depicted line pulses on the line 90 are indicative of band position traversals when the print head 20 is moving down and that the depicted line pulses on the line 92 are indicative of the band position traversals when the print head 20 is moving up. The correct train of line pulses is selected by first setting a flip-flop 336 high or low depending on the BAND DIRECTION signal on the incoming line 54 when the execute print signal, XP, on the line 58 is received. If the BAND DIRECTION signal is high (indicating a "BAND DOWN" command from the band difference and direction logic 50 ) then the 1's output of the flip-flop 336 will be high on a line 338 which is branched via a line 340 into an AND gate 342. The line pulses for a "BAND DOWN" count are therefore gated through the AND gate 342 to an OR gate 344 and hence applied to the decrement input side of the downcounter 332. If the incoming BAND direction signal on the line 54 is low (thus indicating a "BAND UP") then the 0's output of the flip-flop 336 will be high on a line 346 that is branched via a line 348 into an AND gate 350. Hence the line pulses for a "BAND UP" count are gated through the AND gate 350 and through the OR gate 344 to thereafter be applied to the decrement input side of the difference downcounter 332.

The difference downcounter 332 is thus seen to contain at any instant of time the remaining band difference in terms of a numerical count of band print position yet to be traversed in moving the print head 20 into a band print position. The band difference (or numerical count) is decremented each time a gated line pulse is applied to the decrement input side. The decremented three bit band difference from the difference downcounter 332 is outputed on bit lines 352, 354 and 356 and in turn inputed to a range decoder 358. The range decoder 358 outputs a units 10 difference corresponding to the three binary inputs on the lines 352, 354 and 356 respectively. As seen from FIG. 10, the range decoder contains units 10 outputs for the values 0–7 inclusively corresponding to the eight bands of FIG. 2B. These units 10 outputs are normally high except for the one output that reflects the current units 10 difference.

Figure 10:
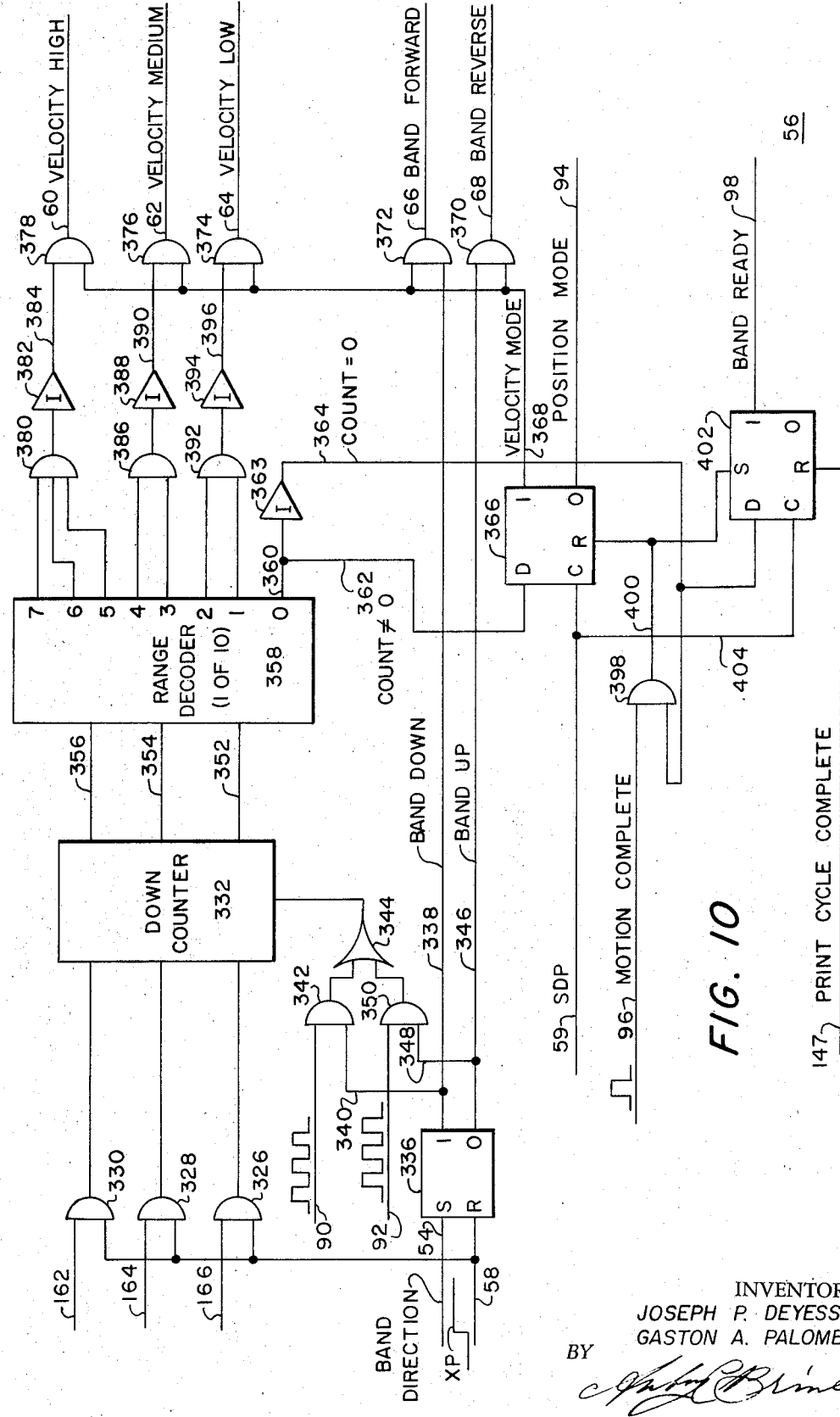
FIG. 10 is a logic block diagram of the band servo control of FIG. 3.

Thus, for a decoded difference which is other than 0, the 0 output on line 360 will normally be high. This is indicated in FIG. 10 by a COUNT=0 signal appearing on a line 362 which is branched from the line 360. The signal on the line 360 is also inverted through an inverter 363 and outputed on a line 364. When the range decoder 358 indicates a difference of 0 on the line 360 by a low level signal thereon, the inverted level on the line 364 will be high to indicate that the difference count is 0. Thus, a high level signal on the line 362 represents a COUNT=0 and a high level signal on the line 364 represents a COUNT = 0. The binary level signal for a COUNT = 0 appearing on the line 362 is inputed to the D input of a multiple flip-flop 366. The flip-flop 366 is a "D type" flip-flop that is manufactured by Texas Instruments and identifiable by a model number 7474. When the COUNT = 0 signal on the line 362 is high at the time when the SDP pulse is applied, the 1's output of the multiple flip-flop 366 will set high. The 1's output appears on a line 368 and is used to gate both the direction signals on the lines 338 and 346 as well as the yet to be described velocity level signals.

The significance of a logical high signal on the line 368 is that the overall band servo control 56 is now internally conditioned to provide the appropriate velocity level and directional commands to the band function generator 70 via the lines 60–68. In other words, up until this point the band servo control 56 has merely asked the question as to whether or not there is a difference between the present band position of the print head 20 and the new band descriptor. When this question is answered in the affirmative, the velocity mode gating is enabled at the output side of the band servo control 56. Since the servo system downstream of the band servo control 56 will operate in a velocity mode when moving the print head 20 to a new band position, the signal on the line 368 may be properly denoted as VELOCITY MODE. The gating to which the VELOCITY MODE signal is applied allows for an appropriate velocity level and directional command to be outputed to the band function generator 70. For instance, the appropriately high directional signal on either of the lines 338 or 346 is gated through either an AND gate 370 or an AND gate 372 depending on whether the print head 20 is to move BAND FORWARD or BAND REVERSE.

The VELOCITY MODE signal on the line 368 is also applied to a set of three AND gates 374, 376 and 378 respectively. These three AND gates function to output one of three velocity level commands for the downstream band function generator 70 in the following manner. When the units 10 difference count from the range decoder 358 is either 5, 6 or 7, then one of these three range decoder outputs will be low. A single low range decoder output from among these three will cause an AND gate 380 to go low which when inverted through an INVERTER 382 results in a high signal on a line 384. The high signal on the line 384 together with the VELOCITY MODE signal on line 368 is ANDed and AND gate 378 and is outputed as a VELOCITY HIGH signal on the line 60. This signal, as its name implies, commands the band function generator to generate a high velocity level to the downstream servo system. The downstream servo system will only operate at this high velocity level as long as the band distance to be traversed by the print head 20 translates into a band count 5, 6, or 7 as denoted by the corresponding range decoder outputs. It will be remembered that the band count changes with time and merely reflects the current decremented difference of the difference down-counter 332 as previously discussed herein. In a similar manner to the aforementioned generation of a VELOCITY HIGH signal, a VELOCITY MEDIUM signal is generated for range counts of 3 or 4 by an AND gate 386, an INVERTER 388 and a line 390, and a VELOCITY LOW signal is generated for range counts of 1 or 2 by an AND gate 392, an INVERTER 394 and a line 396.

The VELOCITY LOW signal on the line 396 will go to zero when the count on the range decoder 358 switches from 1 to 0. A zero count on the range decoder 358 will result in a count = 0 signal on the line 364. The COUNT=0 signal is fed into an AND gate 398 which is used to gate a MOTION COMPLETE signal coming in on the line 96 from the band function generator 70. The MOTION COMPLETE signal must be anded with the COUNT=0 signal to obtain a true MOTION COMPLETE signal because of various other extraneous pulses that also occur on the line 96. This will be explained hereinafter. The true MOTION COMPLETE signal is gated from the AND gate 398 along a line 400 to reset the flip-flop 366 and hence force the VELOCITY MODE signal low. At the same instant of time, the 0 output of the multiple flip-flop 366 goes high on the line 94 thus generating a POSITION MODE command to the band function generator 70. The POSITION MODE signal enables the closed loop positioning of the printhead 20 through a positional feedback to the band function generator 70 as will be explained hereinafter.

The true MOTION COMPLETE signal appearing on the line 400 also sets the flip-flop 402 high so as to thereby generate a BAND READY signal on the line 98. The BAND READY signal is now sent back to the timing logic 40 as previously explained with reference to FIG. 3. It will be remembered that the timing and control logic 40 generates an impact print stroke, IPS causing the print head 20 to impact print in response to the simultaneous presence of the BAND READY and the SECTOR READY signals. Immediately following the print stroke, a PRINT CYCLE COMPLETE signal from the timing and control logic 40 appears on the line 99 to reset the flip-flop 402 out of the BAND READY condition.

One further function is performed by the multiple flip-flop 402. It will be remembered that the band servo control 56 initially asks the question as to whether or not the band difference count at the output of the range decoder 358 is other than zero. When the answer was in the affirmative, the VELOCITY MODE signal was initiated. Now if the band difference count is zero initially, the VELOCITY MODE, etc. is never activated and instead the COUNT=0 signal will be high on the line 364 as previously discussed. The COUNT=0 signal is branched into the "D" input of the multiple flip-flop 402 which will set the 1's output high when the SDP signal on the line 59 occurs. The 1's output high constitutes the BAND READY signal on the line 98. The multiple flip-flop 402 is thereafter reset back to 0 by the PRINT CYCLE COMPLETE signal on the line 147.

The sector servo control 106 is almost exactly like the band servo control 54 and will therefore not be specifically described. The sector difference is inputed to the sector servo control 106 via the lines 250–254 (as opposed to the lines 162–166 for the BAND servo control 54) and the SECTOR direction is inputed via the line 296 (as opposed to the line 54 for BAND direction). The SECTOR CLOCKWISE signal on the output line 114 corresponds to the BAND DOWN signal and the SECTOR COUNTER-CLOCKWISE signal on the line 116 corresponds to the BAND UP signal. The only real diference in the sector servo control 106 appears in the sector range decoder (corresponding to the range decoder 358 of the band servo control 56). The range decoder difference count outputs for the sector servo control 56 are 0 through 6 (corresponding to a maximum movement of six sector positions in either a clockwise or counter-clockwise manner). The sector difference counts 4, 5 and 6 are grouped together to generate a HIGH VELOCITY command, the sector difference counts 2 and 3 are grouped together to generate a MEDIUM VELOCITY command, and the sector difference count 1 is the sole count for generating a LOW VELOCITY command. The sector servo control 106 otherwise operates in the same manner and with the same gating as its band counterpart.

Throughout the description of the difference and direction logics 50 and 100 and the servo controls 56 and 106, there has been a constant reference back to the timing and control logic 40. It will be remembered that many of the signals appearing in FIGS. 4 and 5 either originated or terminated at the timing and control logic 40. Furthermore, these signals were shown to have occurred in a spaced time relationship so as to initiate certain operations within the aforementioned difference and direction logics and the servo controls. The timing and control logic 40 is thus seen to not have any particular significance of its own and is only to be appreciated in terms of its cooperation with the downstream logical controls.

Figure 11:
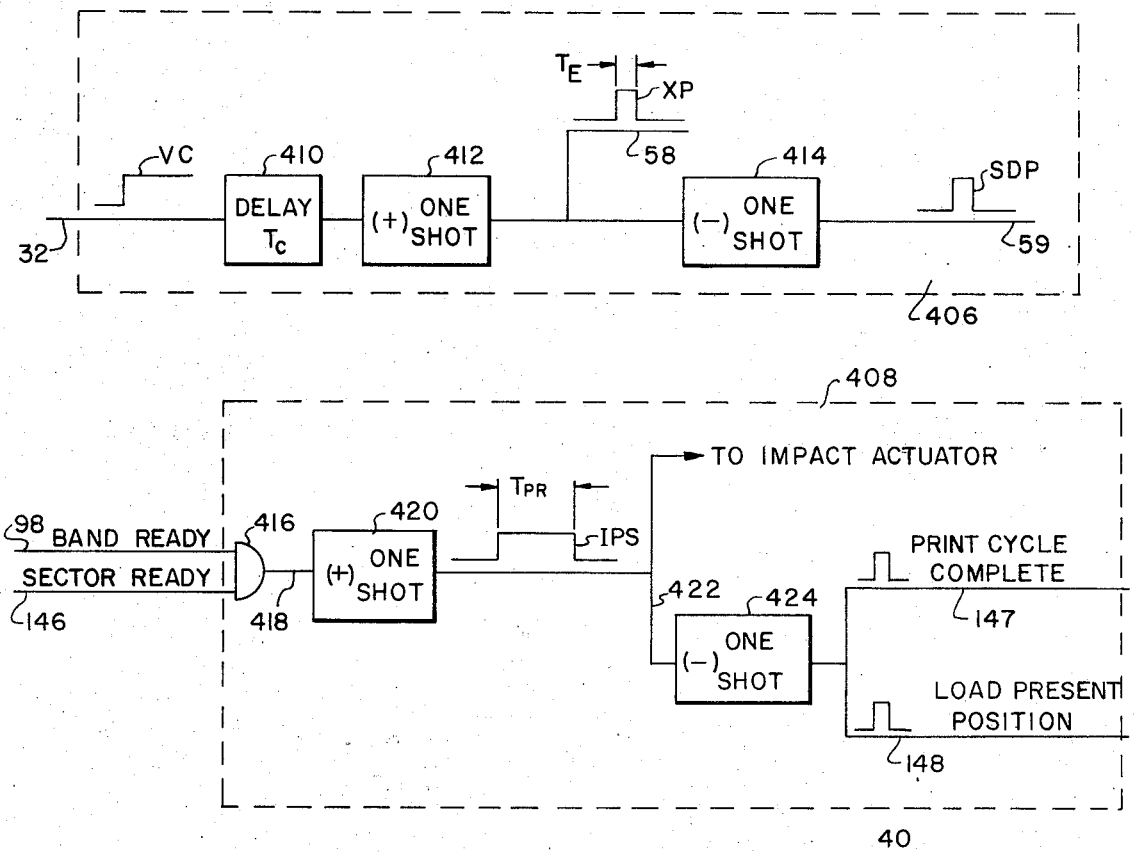
FIG. 11 is a logic block diagram of the timing and control logic of FIG. 3.

Turning now to FIG. 11, the timing and control logic 40 is seen to include two basic portions: (1) the initial command logic 406, and (2) the response logic 408. The initial command logic 406 generates the execute print signal, XP, (FIGS. 4B, and 5B) and the start drum position signal SDP, (FIGS. 4C and 5C) in response to the valid code signal, VC, FIGS. 5A and 5B. VC comes in on the line 32 as shown in FIG. 11 and is delayed a time $T_c$ through the delay 410 and in turn applied to the one shot 412. The one shot triggers on the $T_c$ delayed rise of the VC signal to thereby generate XP on the line 58 as shown in FIGS. 4B and 5B. The XP signal is seen to last a time $T_e$ after which it falls back to zero and thereby triggers a one shot which is set to respond on the downward side of XP. The one shot 414 generates the SDP pulse on the line 59 as shown in FIGS. 4D and 5D. The functions which are performed by the generated pulses, XP and SDP have been previously described in relation to the band and sector channels 46 and 48 respectively. Turning next to the response logic 408, it is seen that the BAND READY and the SECTOR READY signal are inputed on the lines 98 and 146 from the band and sector channels 46 and 48. These signals are anded through AND gate 416 to result in a signal on a line 418 signifying that both BAND READY and SECTOR READY are logically high. The high condition on the line 418 triggers the one shot 420 to generate the IPS signal of FIG. 5L which lasts for a time period $T_{PR}$ equal to the time necessary for the print head 20 to impact print and recover. The IPS signal is directed to an impact actuator and also branced onto a line 422 which feeds into a one shot 424 that is set to trigger on the downside of the IPS signal. The output from the one shot 424 is immediately branched onto the lines 147 and 148. The signal on the line 147 is PRINT CYCLE COMPLETE of FIG. 5M and the signal on the line 148 is LOAD PRESENT POSITION of FIG. 5N. These two signals prepare the band and servo channels 46 and 48 for the next incoming character to be printed.

Figure 12:
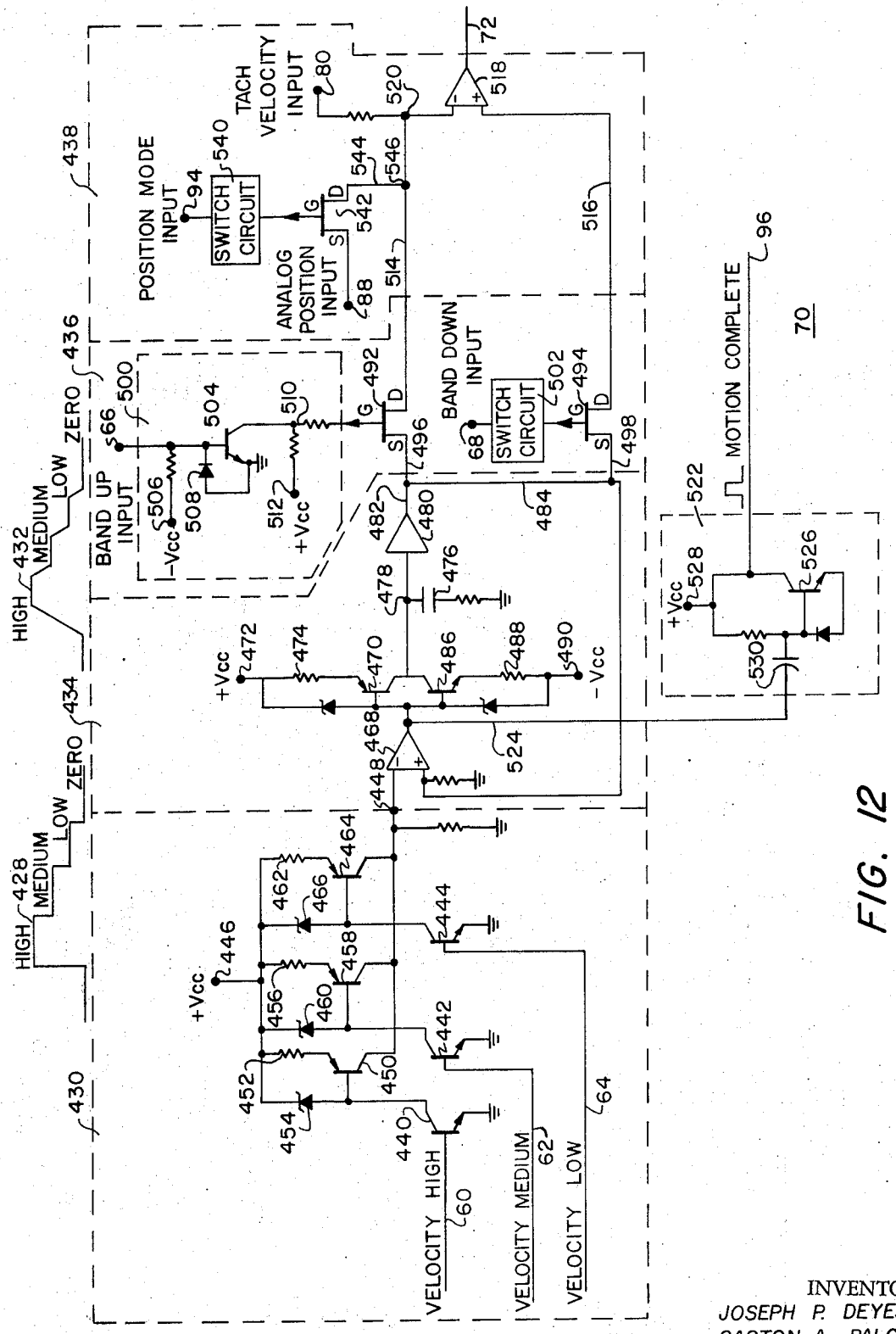
FIG. 12 is a circuit diagram of the band function generator of FIG. 3.

Returning now to the downstream servo portion of the band channel 46 and in particular to the band function generator 70 as shown in FIG. 12, it is seen that the three velocity commands from the band servo control 56 enter the band function generator 70 on the lines 60, 62 and 64. The band function generator 70 first operates to generate an analog signal in response to the digital commands appearing on the lines 60–64. The band function generator does this in essentially two steps: first, it generates a step signal 428 out of a step generator portion 430, and secondly, it generates a ramp signal 432 out of a ramp portion 434. The step signal 428 merely reflects the current velocity level, commanded by the band servo control 56 as dictated by its current difference count. The ramp signal 432 represents a smooth, constant acceleration or deceleration to the various velocity levels defined by the step signal 428. In addition to generating the ramp signal 432, the band function generator conditionally feeds forward the signal within the block area 436. The final main functional block of the band function generator 70 is a summing junction portion 438. The block area 436 feeds the ramp signal 432 in such a manner so as to be properly summed with the various feedbacks from the velocity and position transducers within the summing junction portion 438. A full description of these latter two block areas as well as the signal generating portions of the band function generator 70 immediately follows.

The step generator portion 430 is seen to begin with a set of three switching transistors 440, 442, and 444, each base connected to one of the command lines 60 through 64. These three transistors operate to establish three separate current paths between a reference voltage Vcc at a point 446 and an output point 448. The signal at the output point 448 will correspond to the step signal 428 in a situation wherein all three velocity levels on the lines 60–64 have been separately commanded at different times. The various voltage levels of the step signal 428 will depend on which of the current paths has been turned on at that time. For example, when the VELOCITY HIGH command on the line 60 is logically high, the switching transistor 440 will be turned on which in turn switches on the transistor 450 thereby forming a current path from the point 446 through a resistor 452 and the collector-emitter path of the transistor 450 to the output point 448. The voltage level of the signal 428 at the output point 448 is seen to depend on the value of the resistor 452. A zener diode 454 acts to establish a constant current through the resistor 452. In a similar manner, a second current path through a resistor 456 and a transistor 458 is established when the VELOCITY MEDIUM COMMAND turns on the switching transistor 442. Again a zener diode 450 acts to maintain a constant current through the resistor 456. Finally, a third current path through a resistor 462 and a transistor 464 is established when the VELOCITY LOW command is logically high thus turning on the switching transistor 444. A zener diode 466 again is present to maintain a constant current through the resistor 462. It is thus seen that depending on which current path is made conductive, one of the three resistors 452, 456 and 462 will be placed between the reference voltage point 466 and the output point 488. The values of the three resistors are so chosen to produce the stepped down voltage levels of the signal 428. Finally it will be seen that when the VELOCITY LOW command goes logically low, the last available current path goes open, thus causing the voltage level of signal 428 to go to zero.

Figure 13:
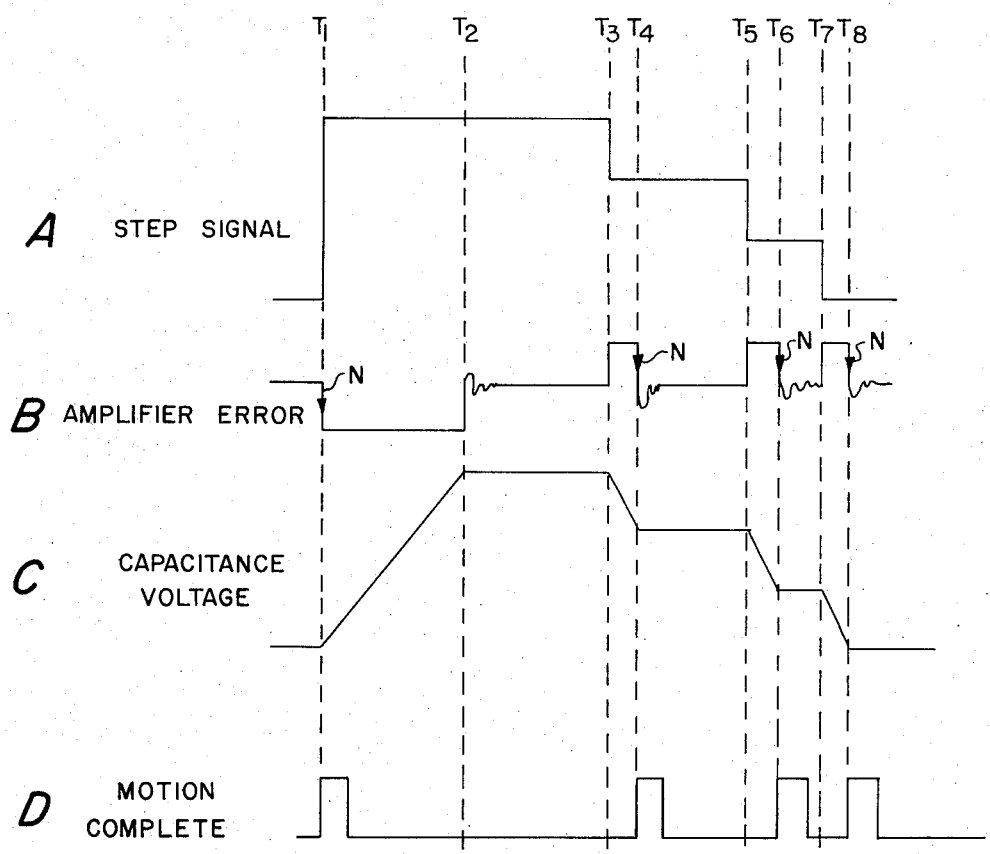
FIG. 13 is a timing diagram depicting the various signals associated with the ramp signal generating portion of the band function generator of FIG. 12.

Turning now to the ramp forming portion 434 of the band function generator 70, the step signal 428 is seen to feed into the inverting input of a high gain differential amplifier 468. The step signal 428 is shown in FIG. 13A with the highest step occurring between time $T_1$ and time $T_3$. This high step initially causes a negative, saturated error signal out of the high gain differential amplifier 468 as shown in FIG. 13B. This negative voltage error out of the high gain differential amplifier 468 turns on a base connected transistor 470, which in turn establishes a constant current source path from a reference voltage point 472 down through a resistor 474 and through its collector-emitter path and hence to a capacitor 476. The capacitor 476 thus charges at a linear rate as shown in FIG. 4C between $T_1$ and $T_2$. The voltage level at a point 478 is thus seen to rise as the capacitor 476 is charged while a buffer amplifier 480 safeguards against any appreciable current leakage. The signal output from the buffer amplifier 480 is the aforementioned ramp signal 432. The ramp signal 432 is thus seen to be the buffered output of the capacitance voltage signal of FIG. 13C. The ramp signal is outputed on a line 482 and thereafter fed back on a line 484 to the noninverting side of the differential amplifier 468 to thus be summed with the inverse of the step signal of FIG. 13A. It will now be appreciated that the negative saturated error signal of FIG. 13B will continue to occur until a time $T_2$ when the buffered capacitance voltage (which is merely the reflection of the capacitance voltage of FIG. 13C) on the line 484 will have risen to the constant step signal voltage level occuring at that same time. At time $T_2$, these two input voltages to the differential amplifier 468 will be equal, thus causing the saturated error voltage to go to zero which will turn off the transistor 470 thus preventing any further charging of the capacitor 476. This zero error condition will continue to occur until a time $T_3$ when the step signal of FIG. 13A drops to a lower voltage level. This results in a high voltage feedback into the differential amplifier then the inverted step signal 428 input. The resulting output of the differential amplifier 468 is a positive saturated error at time $T_3$. This positive saturated error voltage output now turns on a transistor 486 which in turn establishes a constant current sink path from the capacitor 476 and the voltage point 478 back through the collector-emitter path of the transistor 486, down through a resistor 488 and hence to a negative reference voltage point 490. The capacitor 476 is thus seen to discharge until a time $T_4$ wherein the feed back of the buffered capacitor voltage on the line 484 will equal the lower step signal voltage. At time $T_4$ the positive saturated error voltage will go to zero as shown in FIG. 13B. This zero error voltage out of the differential amplifier 468 turns off the transistor 486 hence stopping any further currrent drain on the charged capacitor 476. This process of discharging the capacitor will be seen to occur at times $T_3$, $T_5$, and $T_7$ when the step signal of FIG. 13A is stepped down another voltage level. It is in this manner that the various ramp portions of the ramp signal 432 are formed in response to the step signal 428. These various ramp portions allow for smooth constant deceleration of the print head 20 to the next velocity level which in turn minimizes the harsh vibrations which would occur by mere step signals. This will be of considerable importance during the final ramp to zero velocity as will be explained hereinafter.

Turning next to the block area 436, the ramp signal 432 is seen to be inputed to a pair of field effect transistors (FETs) 492 and 494 via a pair of lines 496 and 498. The FETs 492 and 494 act to allow the ramp signal 432 to pass through one of their respective sources to drain paths depending on which of them has been turned on. The FETs 492 and 494 are each connected to one of a pair of switching circuits 500 and 502 which are in turn made conditionally responsive to the BAND UP signal incoming on the line 66 to the switching circuit 500, or to the BAND DOWN signal incoming on the line 68 to the switching circuit 502. Hence depending on which directional signal is logically high, the respective switching circuit and FET will be energized to thus allow the feed foward of the ramp signal 432. The switching circuit 500 is shown in detail with the understanding that the same circuitry appears in the switching circuit 502. The switching circuit 500 is seen to include a transistor 504 whose base is normally kept low by a supply voltage $-Vcc$ at a point 506 but which is brought high by a BAND UP signal appearing on the line 66. A diode 508 merely insures that the base ordinarily remains at the lower voltage. When the transistor 504 is turned on due to a BAND UP lower case signal on the line 66, the field effect transistor 492 is turned on by virtue of a current flow now established in a line 510. A positive supply voltage at a point 512 merely insures that the FET 492 is off when the transistor 504 is not turned on by the BAND UP signal on the line 66. Thus when the field effect transistor 492 is turned on via a BAND UP, the ramp signal 432 is fed directly into the summing junction portion 438 of the band function generator 70.

The summing junction portion 438 begins with a pair of lines 514 and 516 which are conductively connected to the lines 496 and 498 within the block 436 by the FET's 492 and 494. The line 514 is thus seen to feed the ramp signal 432 into the inverting side of an amplifier 518 when the FET 492 is made conductive in response to the BAND UP signal. Similarly, the line 516 is seen to feed the ramp signal 432 into the noninverting side of the amplifier 518 when the FET is made conductive in response to the BAND DOWN signal. The ramp signal 432 will thus remain positive through the amplifier 518 for the BAND DOWN direction whereas it will be inverted through the amplifier 518 for the BAND UP direction.

Figure 14:
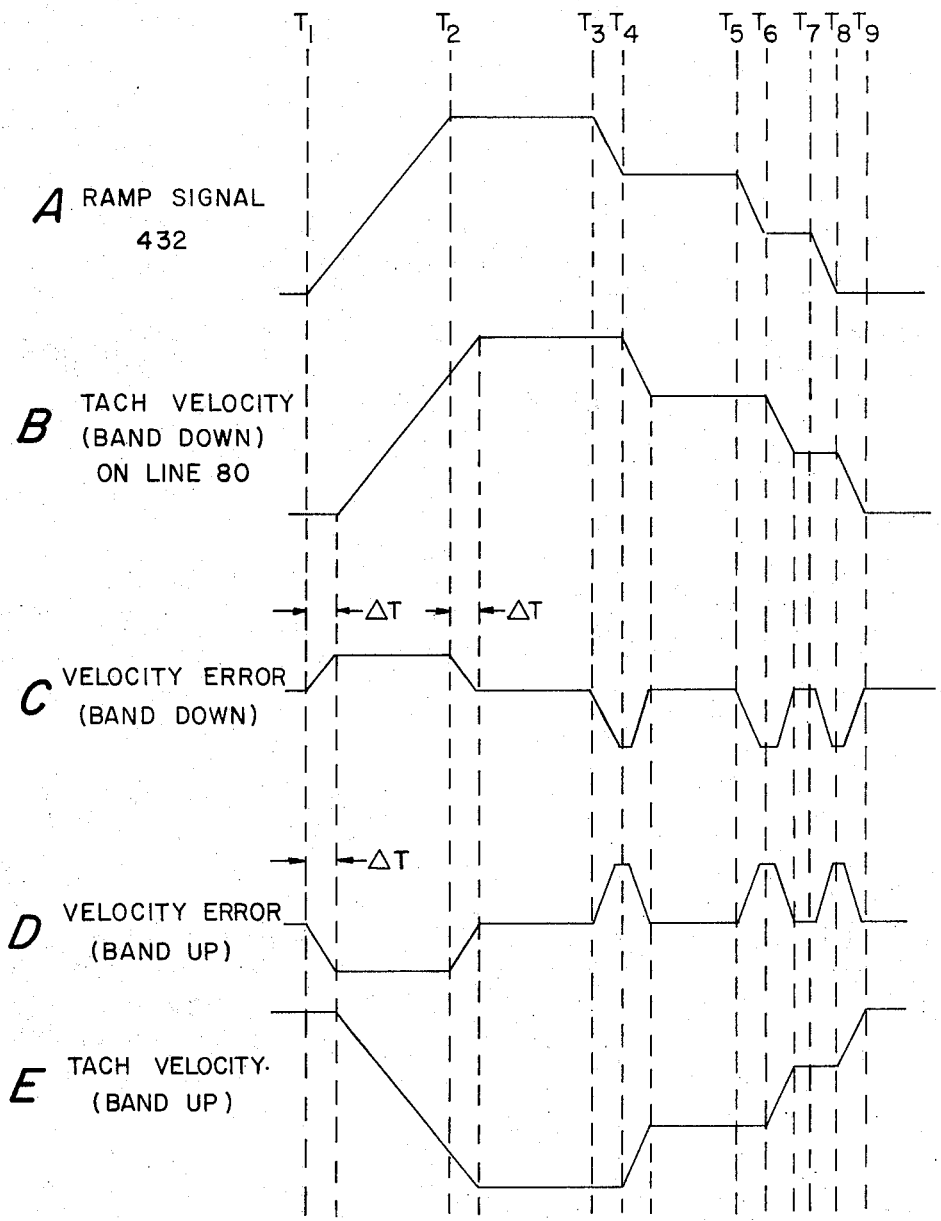
FIG. 14 is a timing diagram of the various signals associated with the summing junction portion of the band function generator of FIG. 12.

Assuming for the moment that the ramp signal of FIG. 14A is initially inputed through the amplifier 518 and out onto the line 72, referring to FIG. 3, the signal on the line 72 will be amplified by the power amplifier 74 and applied to the band servo motor 76. The tachometer which is mechanically connected to the servo motor 76 will output a TACH VELOCITY signal for this BAND DOWN situation as shown in FIG. 14B. The TACH VELOCITY signal is fed back to the summing junction portion 438 via the line 80 which is branched into the line 514 at a point 520. The fed back signal is thereafter inputed to the amplifier 518 where it is first inverted and then summed with the ramp signal 432 incoming on the line 516. The resulting VELOCITY ERROR signal occurring on the line 72 is as shown in FIG. 14C. As seen in FIG. 14C, the VELOCITY ERROR signal first rises for a time $\Delta T$ corresponding to the delay $\Delta T$ in the TACH VELOCITY signal of FIG. 14B. Since the TACH VELOCITY signal and the ramp signal 432 rise at the same rate with only a delay $\Delta T$ in the TACH VELOCITY, the VELOCITY ERROR will be constant after $\Delta T$. When the TACH VELOCITY still rises after a time $T_2$ for a period $\Delta T$, the error signal of FIG. 14C will ramp downward (due to the inversion of the TACH VELOCITY signal in FIG. 14C within the amplifier 518). The VELOCITY ERROR signal of FIG. 14D is hence seen to go negative at times $T_3$, $T_5$ and $T_7$ due to the downward ramps which occur in the ramp signal of FIG. 14A prior to receiving any similar feedback from the signal of FIG. 14B. The VELOCITY ERROR (BAND DOWN) is seen to return to zero each time the delayed downward ramps of FIG. 14 occur at times $T_4$, $T_6$ and $T_8$. The delayed downward ramps of FIG. 14B cause corresponding upward error ramps in FIG. 14C due to the inversion of the FIG. 14B signal within the amplifier 518.

Now assuming that instead of a BAND DOWN movement, a BAND UP movement is ordered thus feeding through the ramp signal 432 on the line 514. The ramp signal 432 will be inverted within the amplifier 518 to thus initially produce for a time $\Delta T$ a negative going VELOCITY ERROR signal as shown in FIG. 14D. This initial ramp error in FIG. 14D will level off when the TACH VELOCITY signal of FIG. 14E is summed with the ramp signal 432 at the point 520. The summing point for the BAND UP situation is thus seen to be the point 520. The summed error is thereafter fed through the inverting input of the amplifier 518 to thus become the VELOCITY ERROR signal for BAND UP as shown in FIG. 14D. The VELOCITY ERROR of FIG. 14D is seen to ramp positively and return to zero due to the downward ramps of FIG. 14A leading the delayed corresponding downward ramps of FIG. 14E.

The band function generator 70 has thus far been seen to operate in a velocity mode as dictated by the command velocity levels incoming on the lines 60-64 from the band servo control 56. It will now be seen that the band function generator 70 is capable of generating a MOTION COMPLETE signal indicating to the band servo control 56 that it is now generating a zero velocity level to the summing junction area of the closed loop velocity servo. This capability is embodied in a 522 together with certain logic within the band servo control 56 as will be explained hereinafter.

The detection circuit 522 is connected to the output of the differential amplifier 468 via a line 524 and is constructed in such a manner so as to detect a negative voltage transition in the amplifier error output of FIG. 13B. The detection circuit is seen to generate pulses as shown in FIG. 13D corresponding to the negative voltage transitions, N, of FIG. 13B. This is accomplished by a transistor 526 which is normally conducting from the collector to the emitter by virtue of the voltage Vcc at a point 528, but which is turned off by a negative voltage transition on a capacitor 530. The negative voltage transition of the capacitor 530 is seen to occur every time a negative transition takes place in the amplifier output of FIG. 13B. Each time the transistor 526 is turned off due to a negative voltage transition at the output of the amplifier 468 the voltage on the output line 96 will go high to thus produce any of the pulses shown in FIG. 13D.

It is to be understood that the only significant negative voltage transition of the amplifier error signal in FIG. 13B occurs at a time $T_8$. It is at this time that the ramp signal 432 of FIG. 14A (as reflected in the capacitance voltage of FIG. 13C) is signifying a zero velocity to the band servomotor 76. This particular pulse is separated out from the other pulses when it is fed back on the output line 96 to the band servo control 56 as shown in FIG. 10. The entire pulse train which has been heretofore referred to as the MOTION COMPLETE signal is gated with COUNT=0 at the AND gate 398 to thuse generate a true MOTION COMPLETE signal on the line 400. It is thus seen that the band servo control 56 can effectively discriminate from among the pulses occurring on the line 96 and only select that pulse which occurs at count=0. The true MOTION COMPLETE signal on the line 400 is seen to reset the multiple flip-flop 366 into a POSITION MODE command that is fed out on the line 94 and back to the band function generator 70.

The POSITION MODE command enters the summing position 438 on the line 94 and turns on a switch circuit 540 which draws the grid current from a FET 542 thereby forming a conductive path from source to drain. The switch circuit 540 is the same as the circuit 500. The FET 542 conductively connects the incoming line 88 to a line 544 which is branched into the line 514 at a point 546. When the FET 542 is made conductive from source to drain, the ANALOG POSITION feedback on the line 88 is fed out onto the line 544 to the point 546 and hence along the line 514 to the inverting side of the amplifier 518. The band servo motor 76 will hence be finally positioned by nulling out any analog position feedback from the line 88 at the amplifier 518. It is to be noted that during this final positioning, the TACH VELOCITY INPUT is still present on the line 80, but is small in comparison to the positional feedback on the line 88. It is to be furthermore understood that the nulling out of any position feedback acts as a detent to hold the print head 20 in the final print position.

The sector function generator 118 will not be described herein as it is exactly the same as the band function generator 70. The positive defined sector movement is SECTOR CLOCKWISE which corresponds to the BAND DOWN directional signal within the band function generator. The three sector velocity commands are handled in exactly the same manner as was the three band velocity commands. The same cooperative transition from velocity to positional closed loop control of the band servo motor 76 is true for the sector servo motor 124.

The band and sector servo motors 76 and 124 are DC servos that are quickly responsive to the closed loop velocity control. The variable speed capabilities of the motors complement the velocity profiling of the closed loop velocity control to thus allow for an extremely quick and accurate positioning of the print head 20. The tachometers 78 and 126 are bidirectional d.c. and therefore feedback a properly signed signal for summing with the requested velocity level existing within the particular function generator. It will be remembered that the velocity feedback is automatically subtractive from the defined positive going direction of movement.

Figure 16:
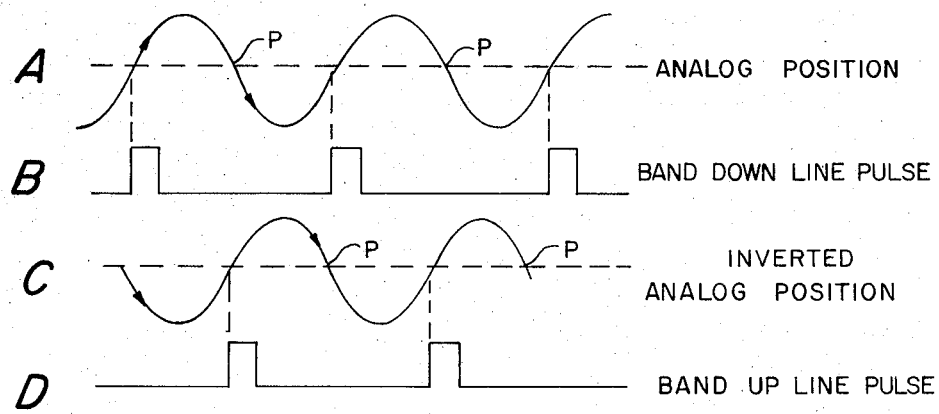
FIG. 16 is a timing diagram of the signals associated with the band sense amplifier of FIG. 15.

The position transducers 82 and 130 respectively consist of a pair of magnetic resistors (mistors) which sense gear teeth on a disk mechanically coupled to the shafts of the servomotors. Each position transducer is connected to a respective sense amplifier. The sense amplifier 86 in the band channel 46 is shown in detail in FIG. 15. A pair of mistors 550 and 552 which form the position transducer 82 are connected into a bridge 554. The output of the bridge 554 is amplified through an amplifier 556 which in turn produces a nearly sinusoidal signal on a line 558 when the servo motor shaft is rotating at constant velocity. This nearly sinusoidal signal is shown in FIG. 16A wherein each negative going zero cross over point P, represents the exact center of a band position on the print head 20, for a BAND DOWN direction. A line pulse generator 560 generates a train of forward line pulses onto the line 90 as shown in FIG. 16B. The line pulse generator 560 is seen to trigger at each positive going zero crossover point which is a half cycle ahead of the points P. This half cycle represents a distance of travel equal to one half the total distance between band positions.

The triggering of the line pulse generator 560 at a distance of one half of the distance between band positions provides an inherent lead of one half of a position in the digital logic within the band servo control 56. In other words, the digital difference as stored within the difference downcounter 332 of the band servo control 56 (as shown in FIG. 11) will always reflect the next lower difference count on the range decoder 358 when the print head 20 still has a half positional distance to travel to that count. This is used to particular advantage in the final positioning of the print head 20 which will now be discussed. When the band servo control 56 receives the last line pulse on the line 90, the difference downcounter 332 is decremented to zero and the output of the range decoder 358 changes from a difference count of 1 to a difference count of zero. At this point in time, the VELOCITY LOW signal on the line 64 will be turned off which will in turn cause the step signal 428 within the band function generator 70 to go from a low velocity to a zero velocity. Referring to FIG. 13A, it is seen that the step signal 428 goes to a zero velocity at a time $T_7$. It will be remembered that any reduction in the velocity level of the signal in FIG. 13A will produce a corresponding amplifier error in FIG. 13B. The amplifier error which exists between times $T_7$ and $T_8$ produces the downward ramp of the capacitance voltage of FIG. 13C during the same times. It will be remembered that the capacitance voltage of FIG. 13C is buffered and outputed as the ramp signal 432 of FIG. 14A. The ramp signal of FIG. 14A between times $T_7$ and $T_8$ is seen to generate a corresponding VELOCITY ERROR that begins at time $T_7$ as shown in FIG. 14C for the BAND DOWN direction. The VELOCITY ERROR for BAND DOWN is seen to continue until a time $T_9$ when the TACH VELOCITY feedback of FIG. 14B goes to zero. It is also seen from the TACH VELOCITY signal that the printhead 20 experiences a smooth velocity transition to zero velocity. This smooth velocity transition to zero velocity is timed so that the print head 20 has traveled the remaining half positional distance to its final print position.

Figure 15:
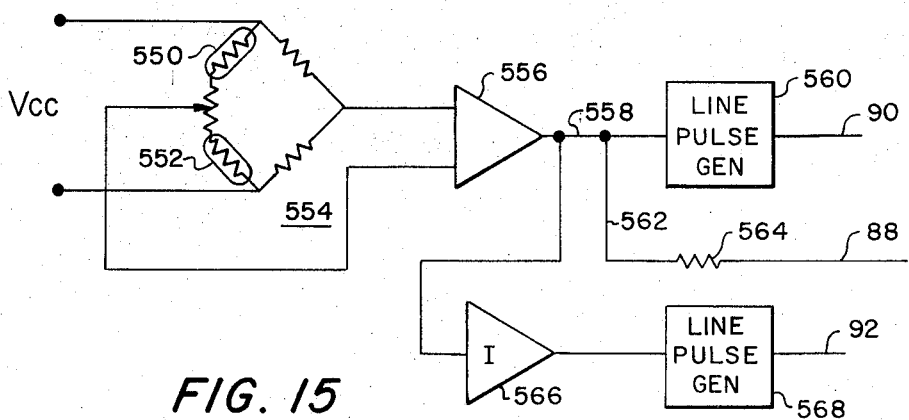
FIG. 15 is an electrical schematic showing of the band sense amplifier of FIG. 3.

While it is seen that the print head 20 is approximately positioned by the final velocity ramp previously discussed, it is to be remembered that the band function generator 70 switches to a position mode at the time $T_8$ when the MOTION COMPLETE pulse of FIG. 13D is fed back to the band servo control 56. It is now to be appreciated that this MOTION COMPLETE signal is somewhat of a misnomer since the print head 20 is still to be positioned the last half positional distance. In any event, the MOTION COMPLETE signal causes the eventual establishment of the POSITION MODE at some time following time $T_8$ to thus enable the band function generator to operate in a closed position loop. The analog position feedback for this latter loop is seen in FIG. 15 to be outputed on a line 562 through a resistor 564 and hence onto the line 88. It is thus seen that the print head 20 is moved gradually to a zero velocity while at the same time a positional loop is established for any final fine positioning via the line 88 feeding back into the summing junction portion of the band function generator 70.

While the BAND DOWN positioning of the print head 20 has been discussed, it should be remembered that the opposite direction of travel is also possible. In order for the band sense amplifier 86 to provide digital indications of the opposite direction of movement namely BAND UP, it is necessary to invert the bridge output signal through an inverter 566 and hence through a line pulse generator 568. The output from the inverter 566 is shown in FIG. 16C and the output of the line pulse generator 568 is shown in FIG. 16D. The line pulses of FIG. 16D are seen to trigger on the positive going zero crossover point and the band position P are seen to occur a half position distance later. Since the sense amplifier 86 does not known which direction the print head 20 is actually moving, the line pulses on the lines 90 and 92 are fed back to the band servo control 54 wherein the correct pulse train is chosen depending on the direction in which the servo is known to be operating in. It is to be noted that a similar position feedback on the sector channel 48 exists by virtue of a sense amplifier 134 which outputs a set of line pulses on the lines 138 and 140 and an analog position on the line 136.

A set of complete multiple closed loop servo systems has been disclosed for both axially and rotationally positioning the serial printer print head 20. The two servo systems each allow for a quick and direct determination of the best possible direction to proceed in positioning the print head 20. The systems also each define a sequence of stepped velocities for a closed velocity loop servo which allows the print head to move at various velocity levels depending on its distance away from final print position. These various velocity levels are each arrived at by a series of smooth constant acceleration or decceleration ramps to the next velocity level to thereby minimize overshoot and subsequent vibration of the print head 20. The final positioning of the print head 20 is implemented at approximately zero velocity by a position loop which is activated only during the latter portion of the entire positioning sequence. The resulting motion of the print head 20 provides heretofore unaccomplished speed and accuracy in tbe serial printer art.

While the invention has been particularly shown and described herein, it will be understood by those skilled in the art that other changes in form and details may be made without departing from the spirit and scope of the invention.

What is claimed:

1. A system for controlling the displacement of a print head in moving from a previous print position to a new print position comprising:
   at least one means for receiving a coded description of the new print position of the new character to be printed;
   at least one means for temporarily storing a coded description of the previous print position of said print head;
   at least one means for calculating both an initial numerical difference count and either a forward or reverse direction for the print head to be displaced in moving from the previous print position to the new print position, said calculating means being connected to said receiving means and to said temporary storage means;
   at least one means for commanding a series of different constant displacement rates for moving the print head in the calculated direction in response to the initial numerical difference count as outputted from said calculating means, said command means comprising:
      means for storing the numerical difference count as outputted by said means for selecting the numerical difference count and direction, and
      means for selecting a constant displacement rate corresponding to the initial stored numerical difference count, said selecting means including a plurality of constant displacement rates, each of which corresponds to a range of numerical difference counts; and
   at least one means for displacing the print head only in the calculated direction in response to the commanded constant displacement rates as outputted from said command means, the displacement of the print head in the calculated direction occurring at a first commanded displacement rate corresponding to the initial numerical difference count and at subsequently commanded different displacement rates corresponding to numerical difference counts formulated as the print head moves in the calculated direction.

2. The system of claim 1 wherein each of said calculating means comprises:
   means for calculating a numerical difference count for displacing the print head to the new print position in a forward direction;
   means for calculating a numerical difference count for displacing the print head to the new print position in a reverse direction; and
   means for selecting the numerical difference count and corresponding direction which will result in the least distance of travel of the print head in moving to the new character position.

3. The system of claim 2 further comprising:
   means for sensing the displacement of the print head, said sensing means attached to said print head and generating a displacement signal;
   means for generating pulses in response to the displacement signal, said pulse generating means connected to said displacement sensing means; and
   means for feeding back the pulses to said means for storing the numerical difference count so as to provide an accounting of how many character positions have been traversed by the print head since moving from the previous print position.

4. The system of claim 3 wherein each of said means for storing the numerical difference count comprises:
   a downcounter for storing the numerical difference count as it is initially outputed from said means for selecting the numerical difference count, said downcounter being connected to said means for feeding back the pulses so as to be decremented each time a pulse appears at the decrementing input side thereby making the stored numerical difference count equal to the number of character positions on the print head yet to be traversed in moving the print head to the new print position.

5. The system of claim 4 wherein each of said means for selecting a constant displacement rate corresponding to the stored numerical difference count comprises:
   a plurality of logic gates each of which generates a binary command indicative of a given constant displacement rate; and
   means for activating one of said logic gates at any one time in response to each stored numerical difference count within said downcounter.

6. The system of claim 1 wherein each of said means for displacing the print head comprises:
   means for generating a step signal having a ramp between each successive step level in response to the various constant displacement rates outputed from said command means;
   a motor connected to said step signal generating means for moving the print head at a ramp velocity rate dictated by the amplitude of the step signal;
   means for sensing a rate of displacement of the print head; and
   means for feeding back the rate of displacement to be summed with the step signal.

7. The system of claim 6 wherein each of said means for generating a step signal having ramp between each successive step level further comprises:
   circuit means for generating a step signal having step levels corresponding to the constant displacement rate levels at which the means for displacing the print head is to move; and
   means for generating ramps between the various constant displacement rates of the step signal having step levels.

8. The system of claim 7 wherein each of said means for generating ramps between the various constant displacement rates of the step signal having step levels comprises:
   a differential amplifier one side of which is connected to said circuit means for generating a step signal;
   a current source circuit connected to the output of said differential amplifier;
   a circuit for drawing off current connected to the output of said differential amplifier;
   a capacitance connected to both said current source circuit and to said current drawing circuit so as to either linearly charge or discharge depending on whether the current source circuit or the current drawing circuit are turned on; and
   a feedback path connected to said capacitance circuit and connected to said differential amplifier so as to feedback the capacitance voltage for summing with the step signal having step levels which appears as the other input to said differential amplifier.

9. The system of claim 8 wherein each of said means for displacing the print head further comprises:

means for feeding back the print head displacement, said means for feeding back the print head displacement being connected to said means for sensing the print head displacement;

means for conditionally switching the fed back print head displacement into the input of said motor for moving the print head;

means for detecting a portion of the final ramp of the step signal having a ramp between each successive step level as it declines to a zero displacement rate said detection means connected to said differential amplifier; and means for applying the output of said detection means to said conditional switch means so as to switch the feedback of the print head displacement into said motor when the step signal having a ramp between each successive step level has gone to zero.

10. A system for controlling the displacement of a print head within a printer containing a first closed loop feedback path comprising:

means for displacing the print head from a previous print position to a new print position;

means for sensing the displacement of the print head;

means for generating pulses indicative of the successive traversals of various possible print positions as the print head moves to the new print position said pulse generating means connected to said displacement sensing means;

means for maintaining a numerical count of the print positions yet to be traversed in moving the print head to the new print position;

means for decrementing the numerical count of the print positions yet to be traversed in response to the pulses generated by said means for generating pulses indicative of the successive traversals of various print positions;

means for selecting a defined first constant displacement rate for said means for displacing the print head from among a plurality of constant displacement rates in response to the numerical count of the print positions yet to be traversed said selection means including a plurality of defined different constant displacement rates each of which corresponds to a range of numerical counts; and means for inputting the selected first constant displacement rate to said means for displacing the print head, and subsequently imparting other constant displacement rates corresponding to numerical counts of the print positions yet to be traversed.

11. The system of claim 10 wherein said means for inputing the selected constant displacement rate comprises:

means for generating a signal in response to the selected displacement rates; and means for generating ramps between the various step levels of the step signal to thereby form a step signal having a ramp between each successive step level.

12. The system of claim 11 further containing a second feedback path comprising:

means for sensing the displacement rate of the print head; and means for summing the displacement rate with the step signal having a ramp between each successive step level.

13. The system of claim 12 further containing a third feedback path comprising:

means for generating an analog displacement signal, said analog generating means connected to said displacement sensing means; and means for conditionally feeding back the analog displacement signal for input to the means for displacing the print head.

14. The system of claim 13 wherein said means for conditionally feeding back the analog displacement signal comprises:

means for conditionally switching the fedback analog displacement into the input of said means for displacing the print head;

means for detecting the final ramp of the step signal having a ramp between each successive step level as it declines to a zero displacement, said detection means connected to said means for generating ramps; and means for applying the output of said detection means to said conditional switch means so as to switch the fedback analog displacement signal into the input of said means for displacing the print head.

15. In a serial printer wherein a print head is caused to move axially and rotationally in positioning a given character on its surface for impact printing, a system for controlling the movement of the print head in the axial direction and for controlling the movement of the print head in the rotational direction comprising:

means for calculating initial minimum distance to be traveled in moving the print head in the respective axial and rotational direction so as to position a particular character on its surface;

means for commanding a series of different constant displacement rates for moving the print head in the axial direction in response to the calculated initial minimum distance to be traveled in moving the print head in the axial direction, said axial command means comprising:

means for selecting an initial constant axial displacement rate corresponding to the initial minimum distance to go in the axial direction, said selecting means including a plurality of different constant axial displacement rates each of which corresponds to a range of travel distances for input to go in the axial direction of movement; an axial servo drive for positioning the particular character on the print head surface in the axial direction in response to the commanded constant displacement rates as outputted from said axial command means, the displacement rate of the print head in the calculated direction occurring at a first commanded axial displacement rate corresponding to the initial minimum distance to be traveled in the axial direction and at subsequently commanded different axial displacement rates corresponding to the distance yet to be traveled in the axial direction;

means for commanding a series of different constant displacement rates for moving the print head in the rotational direction in response to the calculated minimum distance to be traveled in moving the print head in the rotational direction, said rotational command means comprising:

means for selecting an initial constant rotational displacement rate corresponding to the initial minimum distance to go in the rotational direction, said rotational means including a plurality of different constant rotational displacement rates each of which corresponds to a range of travel distances for input to the rotational servo drive in response to the calculated mimimum distance to go in the rotational direction of movement; and a rotational servo drive for positioning the particular character on the print head surface in the rotational direction in response to the commanded constant displacement rates as outputted from said rotational command means, the displacement rate of the print head in the calculated direction occurring at a first commanded rotational displacement rate corresponding to the initial minimum distance to be traveled in the rotational direction and at subsequently commanded different rotational displacement rates corresponding to the distance yet to be traveled in the rotational direction.

16. The system of claim 15 wherein said calculating means comprises two independently functioning calculating means each of which comprises:

means for retaining a positional description of the previous character printed;

means for calculating a distance to be traveled in positioning the new character to be printed from a first approach direction;

means for calculating a distance to be traveled in positioning the new character to be printed from a second approach direction; and means for selecting the lesser of the two distances to be traveled and the corresponding approach direction.

17. The system of claim 16 further comprising:

means for sensing the axial and rotational displacements of the print head as it moves to position a particular character on its surface;

means for separately feeding back the axial and rotational displacements to the respective axial and rotational selection means;

said axial and rotational selection means each comprising means for retaining a representation of the respective axial and rotational distances yet to be traveled in positioning the character on the print head surface and means for updating the representation of the distance yet to be traveled within said retaining means in response to the respectively fed back displacement from said means for separately feeding back the axial and rotational displacements.

18. The system of claim 17 further comprising;

means for generating a step signal in response to the selected constant displacement rates; and means for generating ramps between the various step levels of the step signal to thereby from a step signal having a ramp between each successive step level.

19. In a printer, the method of moving a print head to a new print position from a previous print position comprising the steps of:

calculating the initial positional difference for the print head moving in a forward direction;

calculating the initial positional difference for the print head moving in a reverse direction;

selecting the calculated initial positional difference and calculated direction wherein the print head has the least distance to move to a new print position;

selecting an initial constant displacement rate corresponding to the least distance to move to the new print position from a number of possible different constant displacement rates each of which corresponds to a range of positional differences, said selection being made according to the calculated initial positional difference;

moving the print head at the selected initial displacement rate in the selected, calculated direction;

measuring the distance of travel as the print head moves towards the new print position;

decrementing the positional difference representing the current distance yet to be traveled by the print head according to the measured distance of travel;

selecting a constant displacement rate at which the print head is to be moved from a number of possible different constant displacement rates each of which corresponds to a range of positional differences, said selection being made according to the decremented positional difference;

moving the print head at the selected rate only in the selected, calculated direction; and repeating said steps of measuring, decrementing, selecting and moving at the selected rate until the new print position is reached.

20. The method of claim 19 wherein said step of adjusting the displacement rate comprises the steps of:

selecting a constant displacement rate corresponding to the decremented positional difference; and forming a multi-level signal in which each successively selected constant displacement rate is lower than the previous displacement rate.

21. The method of claim 20 wherein said step of forming a multi-level signal comprises the steps of:

generating a step signal indicative of the various selected displacement rates at which the print head is to be moved; and generating ramps between the various steps of the step signal.

22. The method of claim 21 further comprising the steps of:

detecting the final ramp as it hits a zero displacement rate;

generating a detection signal;

measuring the distance of travel remaining to finally position the print head; and moving the print head the remaining measured distance in response to the measured distance of travel when the detection signal occurs.

23. In a serial printer wherein a print head is caused to move axially and rotationally in positioning a given character on its print head surface for impact printing, a method of controlling the axial and rotational movements of the print head comprising the steps of:

calculating minimum distances to be traveled in moving the print head in the respective axial and rotational directions so as to position a particular character on its surface;

commanding initial axial and rotational constant displacement rates at which the print head is to initially move;

moving the print head at the initially commmanded constant axial and rotational displacement rates;

sensing the axial and rotational displacements of the print head as it moves to position a particular character on its surface;

separately feeding back the sensed axial and rotational displacements;

calculating axial and rotational distances yet to be traveled from the feedback of the axial and rotational displacements of the moving print head;

selecting constant displacement rates from among a group of constant displacement rates wherein each displacement rate corresponds to a range of distances yet to be traveled for each direction of movement;

generating a series of downwardly stepped constant displacement rates for each respective direction of movement in response to said selected constant displacement rates corresponding to a range of distances yet to be traveled; and moving the print head at each of the downwardly stepped constant displacement rates in each direction of movement.

24. The method of claim 23 wherein said step of generating a series of downwardly stepped constant displacement rates for each respective direction of movement comprises the step of:

generating a step signal in response to the selected displacement rates; and generating ramps between the various step levels of the step signal to thereby form a step signal having a ramp between each successive step level.

25. The method of claim 24 further comprising the steps of:

detecting the final ramp as it hits a zero displacement rate;

generating a detection signal;

measuring the distance of travel remaining to finally position the print head; and moving the print head the remaining measured distance in response to the measured distance of travel when the detection signal occurs.

* * * * *